US008861868B2

(12) United States Patent
Shechtman et al.

(10) Patent No.: US 8,861,868 B2
(45) Date of Patent: Oct. 14, 2014

(54) PATCH-BASED SYNTHESIS TECHNIQUES

(75) Inventors: Elya Shechtman, Seattle, WA (US);
Daniel R. Goldman, Seattle, WA (US);
Aliakbar Darabi, Albuquerque, NM (US)

(73) Assignee: Adobe-Systems Incorporated, San Jose, CA (US)

( * ) Notice: Subject to any disclaimer, the term of this patent is extended or adjusted under 35 U.S.C. 154(b) by 78 days.

(21) Appl. No.: 13/565,552

(22) Filed: Aug. 2, 2012

(65) Prior Publication Data
US 2013/0051685 A1 Feb. 28, 2013

Related U.S. Application Data

(60) Provisional application No. 61/528,601, filed on Aug. 29, 2011.

(51) Int. Cl.
*G06K 9/68* (2006.01)
*G06T 11/60* (2006.01)

(52) U.S. Cl.
CPC .. *G06T 11/60* (2013.01); *G06K 9/68* (2013.01)
USPC ............ 382/218; 382/233; 382/243; 382/284

(58) Field of Classification Search
CPC ........... G06T 11/60; G06T 15/00; G06T 7/60; G06K 9/80; H04N 1/00323
USPC .................. 382/218, 243, 250, 284
See application file for complete search history.

(56) References Cited

U.S. PATENT DOCUMENTS

| | | | |
|---|---|---|---|
| 4,524,454 A | 6/1985 | Ejiri | |
| 4,851,984 A | 7/1989 | Doi et al. | |
| 5,410,644 A | * 4/1995 | Thier et al. | ..................... 345/582 |
| 5,764,237 A | 6/1998 | Kaneko | |
| 5,867,166 A | 2/1999 | Myhrvold et al. | |
| 5,870,097 A | 2/1999 | Snyder et al. | |
| 5,967,050 A | * 10/1999 | Seymour | ....................... 101/484 |
| 5,999,194 A | 12/1999 | Brunelle | |
| 6,177,927 B1 | 1/2001 | Chery et al. | |
| 6,262,745 B1 | 7/2001 | Perani | |
| 6,272,178 B1 | 8/2001 | Nieweglowski et al. | |

(Continued)

OTHER PUBLICATIONS

Barnes, C., Shechtman, E., Finkelstein, A., and Goldman, D., "PatchMatch: A randomized correspondence algorithm for structural image editing," ACM Trans. on Graphics (Proc. of SIGGRAPH) 28(3) (2009), 10 pages.

(Continued)

*Primary Examiner* — Vu Le
*Assistant Examiner* — Aklilu Woldemariam
(74) *Attorney, Agent, or Firm* — Wolfe-SBMC

(57) ABSTRACT

Methods, apparatus, and computer-readable storage media for patch-based image synthesis. A patch matching technique provides an extended patch search space that encompasses geometric and photometric transformations, as well as gradient domain features. The geometric transformations may include translation, rotation, reflection, scale, and non-uniform scale. The photometric transformations may include gain and bias. Patch-based image synthesis techniques may leverage the extended patch search space in various image synthesis applications. The patch-based image synthesis techniques may also integrate image gradients into the patch representation and replace conventional color averaging with a technique that performs voting for colors and gradients and then solves a screened Poisson equation based on values for colors and gradients when blending patch(es) with a target image.

25 Claims, 23 Drawing Sheets

(56) References Cited

U.S. PATENT DOCUMENTS

| | | | |
|---|---|---|---|
| 6,314,209 B1 | 11/2001 | Kweon et al. | |
| 6,348,924 B1 | 2/2002 | Brinsmead et al. | |
| 6,400,362 B1* | 6/2002 | Uchiyama et al. | 345/420 |
| 6,453,069 B1 | 9/2002 | Matsugu et al. | |
| 6,597,818 B2* | 7/2003 | Kumar et al. | 382/294 |
| 6,636,644 B1 | 10/2003 | Itokawa | |
| 6,687,411 B1 | 2/2004 | Miura et al. | |
| 6,721,444 B1* | 4/2004 | Gu et al. | 382/154 |
| 6,760,483 B1* | 7/2004 | Elichai et al. | 382/241 |
| 6,762,769 B2 | 7/2004 | Guo et al. | |
| 6,919,903 B2 | 7/2005 | Freeman et al. | |
| 6,920,610 B1 | 7/2005 | Lawton et al. | |
| 6,931,600 B1 | 8/2005 | Pittman | |
| 6,937,275 B2 | 8/2005 | Heiles | |
| 6,964,025 B2 | 11/2005 | Angiulo et al. | |
| 6,987,535 B1 | 1/2006 | Matsugu et al. | |
| 7,012,624 B2 | 3/2006 | Zhu et al. | |
| 7,034,848 B2 | 4/2006 | Sobol | |
| 7,069,506 B2 | 6/2006 | Rosenholtz et al. | |
| 7,136,072 B2 | 11/2006 | Ritter | |
| 7,176,908 B2 | 2/2007 | Matsubara et al. | |
| 7,206,532 B2* | 4/2007 | Lofthus et al. | 399/84 |
| 7,239,314 B2 | 7/2007 | Johnston | |
| 7,257,261 B2 | 8/2007 | Suh | |
| 7,283,140 B2 | 10/2007 | Zhou et al. | |
| 7,342,586 B2 | 3/2008 | Jaeger | |
| 7,418,673 B2 | 8/2008 | Oh | |
| 7,479,963 B2 | 1/2009 | Lischinski et al. | |
| 7,551,780 B2* | 6/2009 | Nudd et al. | 382/190 |
| 7,576,756 B1 | 8/2009 | Good et al. | |
| 7,577,313 B1 | 8/2009 | Georgiev | |
| 7,596,751 B2 | 9/2009 | Rowson et al. | |
| 7,639,268 B2 | 12/2009 | Tsunoda | |
| 7,737,977 B2 | 6/2010 | Grassia et al. | |
| 7,831,098 B2* | 11/2010 | Melikian | 382/215 |
| 8,179,384 B2 | 5/2012 | Sakashita et al. | |
| 8,249,365 B1 | 8/2012 | Winnemoeller et al. | |
| 8,280,703 B1 | 10/2012 | Mech | |
| 8,340,463 B1* | 12/2012 | Cho et al. | 382/276 |
| 8,532,387 B2 | 9/2013 | Winnemoeller et al. | |
| 8,599,219 B2 | 12/2013 | Shechtman et al. | |
| 8,619,098 B2 | 12/2013 | Shechtman et al. | |
| 8,787,698 B2 | 7/2014 | Winnemoeller et al. | |
| 2001/0038718 A1* | 11/2001 | Kumar et al. | 382/284 |
| 2003/0090487 A1 | 5/2003 | Dawson-Scully | |
| 2004/0114814 A1 | 6/2004 | Boliek et al. | |
| 2004/0155879 A1 | 8/2004 | Mittring | |
| 2004/0189618 A1* | 9/2004 | Perry et al. | 345/179 |
| 2005/0188304 A1 | 8/2005 | Lawton et al. | |
| 2005/0243089 A1 | 11/2005 | Johnston | |
| 2006/0026524 A1 | 2/2006 | Ma et al. | |
| 2006/0072847 A1 | 4/2006 | Chor et al. | |
| 2006/0085743 A1 | 4/2006 | Baudisch et al. | |
| 2006/0267958 A1 | 11/2006 | Kolmykov-Zotov et al. | |
| 2007/0047008 A1* | 3/2007 | Graham et al. | 358/401 |
| 2007/0047012 A1 | 3/2007 | Bryant | |
| 2007/0098266 A1 | 5/2007 | Chiu et al. | |
| 2007/0165904 A1* | 7/2007 | Nudd et al. | 382/100 |
| 2007/0216701 A1 | 9/2007 | Bruderlin et al. | |
| 2008/0085044 A1* | 4/2008 | Zhou et al. | 382/131 |
| 2008/0086688 A1 | 4/2008 | Chandratillake et al. | |
| 2008/0117214 A1 | 5/2008 | Perani et al. | |
| 2008/0152201 A1 | 6/2008 | Zhang et al. | |
| 2008/0235207 A1 | 9/2008 | Berkner et al. | |
| 2008/0235585 A1 | 9/2008 | Hart et al. | |
| 2008/0238942 A1* | 10/2008 | Sun et al. | 345/634 |
| 2008/0309662 A1 | 12/2008 | Hassner et al. | |
| 2009/0058871 A1 | 3/2009 | Mech et al. | |
| 2009/0208118 A1 | 8/2009 | Csurka | |
| 2009/0276408 A1 | 11/2009 | Auerbach et al. | |
| 2010/0066874 A1 | 3/2010 | Ishiga | |
| 2010/0086220 A1* | 4/2010 | Minear | 382/218 |
| 2010/0092093 A1* | 4/2010 | Akatsuka et al. | 382/203 |
| 2010/0110068 A1 | 5/2010 | Yamauchi et al. | |
| 2010/0177955 A1* | 7/2010 | Simakov et al. | 382/154 |
| 2010/0201803 A1* | 8/2010 | Melikian | 348/90 |
| 2010/0226564 A1 | 9/2010 | Marchesotti et al. | |
| 2010/0251121 A1 | 9/2010 | Rosser et al. | |
| 2011/0016112 A1 | 1/2011 | Yu | |
| 2011/0064388 A1 | 3/2011 | Brown | |
| 2011/0066706 A1 | 3/2011 | Ostrover et al. | |
| 2011/0082728 A1* | 4/2011 | Melikian | 705/14.13 |
| 2012/0133817 A1 | 5/2012 | Anderson | |
| 2013/0120438 A1 | 5/2013 | Shechtman et al. | |
| 2013/0120454 A1 | 5/2013 | Shechtman et al. | |
| 2013/0121608 A1 | 5/2013 | Winnemoeller et al. | |
| 2013/0121613 A1 | 5/2013 | Winnemoeller et al. | |

OTHER PUBLICATIONS

C. Barnes, E. Shechtman, D. Goldman, A. Finkelstein. The generalized patchmatch correspondence algorithm. In ECCV, 2010, 14 pages.

Y. HaCohen, E. Shechtman, D. B. Goldman, and D. Lischinski. Non-rigid dense correspondence with applications for image enhancement. In SIGGRAPH, 2011, 9 pages.

P. Bhat, B. Curless, M. Cohen, and C. L. Zitnick. Fourier analysis of the 2d screened poisson equation for gradient domain problems. In ECCV, 2008, 14 pages.

Bhat, P., Zitnick, C. L., Cohen, M., and Curless, B. 2010. Gradientshop: A gradient-domain optimization framework for image and video filtering. ACM Transactions on Graphics 29, 2, 15 pages.

Yonatan Wexler, Eli Shechtman, Michel Irani. Space-Time Completion of Video. IEEE Transactions on Pattern Analysis and Machine Intelligence, vol. 29, No. 3, Mar. 2007, 14 pages.

Agarwala, A., Dontcheva, M., Agrawala, M., Drucker, S., Colburn, A., Curless, B., Salesin, D., and Cohen, M. 2004. Interactive digital photomontage. In ACM SIGGRAPH, vol. 23, 294-302.

Arias, P., Facciolo, G., Caselles, V., and Sapiro, G. 2011. A variational framework for exemplar-based image inpainting. IJCV 93 (July), 319-347.

A. Bugeau, M. Bertalmio, V. Caselles, G. Sapiro. A Comprehensive Framework for Image Inpainting. IEEE Transactions on Image Processing (IP)—vol. 19 Issue 10, Oct. 2010, 12 pages.

Burt, P. J., and Adelson, E. H. 1983. A multiresolution spline with application to image mosaics. ACM Trans. Graphics 2 (October), 217-236.

Efros, A. A., and Leung, T. K. 1999. Texture synthesis by non-parametric sampling. IEEE Computer Society, Los Alamitos, CA, USA, 6 pages.

Fang, H., and Hart, J. C. 2007. Detail preserving shape deformation in image editing. In ACM SIGGRAPH, vol. 26, pp. 1-5.

Hays, J., and Efros, A. A. 2007. Scene completion using millions of photographs. In ACM SIGGRAPH, vol. 26,4:1-4: 7 pages.

Kaneva, B., Sivic, J., Torralba, A., Avidan, S., and Freeman, W. T. 2010. Infinite images: Creating and exploring a large photorealistic virtual space. In Proceedings of the IEEE, 17 pages.

Kwatra, V., Schodl, A., Essa, I., Turk, G., and Bobick, A. 2003. Graphcut textures: image and video synthesis using graph cuts. In ACM SIGGRAPH, vol. 22, 277-286.

Kwatra, V., Essa, I., Bobick, A., and Kwatra, N. 2005. Texture optimization for example-based synthesis. In ACM SIGGRAPH, vol. 24, 795-802.

Lin, W.-Y., Liu, S., Matsushita, Y., Ng, T.-T., and Cheong, L.-F. Jun. 2011. Smoothly varying affine stitching. In Proceedings of Computer Vision and Pattern Recognition (CVPR), 13 pages.

Mansfield, A., Prasad, M., Rother, C., Sharp, T., Kohli, P., and Van Gool, L. Aug. 29, 2011. Transforming image completion. In Proc. BMVC (British Machine Vision Conference), 11 pages.

Perez, P., Gangnet, M., and Blake, A. 2003. Poisson image editing. In ACM SIGGRAPH, vol. 22, 313-318.

Pritch, Y., Kav-Venaki, E., and Peleg, Sep. 2009. Shift-map image editing. In ICCV, 8 pages.

Rother, C., Bordeaux, L., Hamadi, Y., and Blake, A. 2006. AutoCollage. In ACM SIGGRAPH, vol. 25, 847-852.

Ruiters, R., Schnabel, R., and Klein, R. 2010. Patch-based texture interpolation. Computer Graphics Forum 29, 4 (June), 1421-1429. http://onlinelibrary.wiley.com/doi/10.1111/j.1467-8659.2010.01739.x/abstract.

(56) References Cited

OTHER PUBLICATIONS

Shechtman, E., Rav-Acha, A., Irani, M., and Seitz, S. 2010. Regenerative morphing. In CVPR, 8 pages.
Simakov, D. Caspi, Y., Shechtman, E., and Irani, M. 2008. Summarizing visual data using bidirectional similarity. In CVPR, 8 pages.
Sunkavalli, K., Johnson, M. K., Matusik, W., and Pfister, H. 2010. Multi-scale image harmonization. In ACM SIGGRAPH, vol. 29, 125:1-125:10 pages.
Szeliski, R., and Shum, H.-Y. 1997. Creating full view panoramic image mosaics and environment maps. In ACM SIGGRAPH, 251-258.
Tappen, M., Freeman, W., and Adelson, E. 2005. Recovering intrinsic images from a single image. IEEE Trans. PAMI 27, 9 (sept.), 1459-1472.
Wei, L. Y., and Levoy, M. 2000. Fast texture synthesis using tree-structured vector quantization. In ACM SIGGRAPH, 479-488.
Whyte, O., Sivic, J., and Zisserman, A. 2009. Get out of my picture! internet-based inpainting. In BMVC (British Machine Vision Conference), 11 pages.
U.S. Appl. No. 12/315,038, filed Nov. 26, 2008, Dan Goldman, et al.
U.S. Appl. No. 12/394,280, filed Feb. 27, 2009, Dan Goldman, et al.
U.S. Appl. No. 12/857,294, filed Aug. 16, 2010, Dan Goldman, et al.
U.S. Appl. No. 12/858,546, filed Aug. 18, 2010, Holger Winnemoeller, et al.
U.S. Appl. No. 12/868,519, filed Aug. 25, 2010, Elya Shechtman, et al.
U.S. Appl. No. 12/858,558, filed Aug. 18, 2010, Holger Winnemoeller, et al.
Kajiya, J. T. and Kay, T. L. 1989. Rendering fur with three dimensional textures. SIGGRAPH Comput. Graph. 23, 3 (Jul. 1989), 271-280.
Marschner, S. R., Jensen, H. W., Cammarano, M., Worley, S., and Hanrahan, P. 2003. Light scattering from human hair fibers. In ACM SIGGRAPH 2003 Papers (San Diego, California, Jul. 27-31, 2003). SIGGRAPH '03. ACM, New York, NY, 780-791.
Chen, H. and Zhu, S. 2006. A Generative Sketch Model for Human Hair Analysis and Synthesis. IEEE Trans. Pattern Anal. Mach. Intell. 28, 7 (Jul. 2006), 1025-1040.
H. Chen and S. C. Zhu, "A generative model of human hair for hair sketching", CVPR (IEEE Conference on Computer Vision and Pattern Recognition), 2:74-81, 2005.
David J. Heeger and James R. Bergen. Pyramid-based texture analysis/synthesis. In SIGGRAPH 95, pp. 229-238, 1995.
U.S. Appl. No. 12/868,540, filed Aug. 25, 2010, Elya Shechtman, et al.
"Corrected Notice of Allowance", U.S. Appl. No. 12/858,546, (Jun. 6, 2013), 8 pages.
"Notice of Allowance", U.S. Appl. No. 12/858,546, (May 6, 2013), 12 pages.
"Notice of Allowance", U.S. Appl. No. 12/868 519 (Jun. 17, 2013), 10 pages.
"Notice of Allowance", U.S. Appl. No. 12/868,540, (Jul. 22, 2013), 10 pages.
"Final Office Action", U.S. Appl. No. 12/858,558, (Feb. 15, 2013), 14 pages.
"Non-Final Office Action", U.S. Appl. No. 12/858,546, (Jan. 30, 2013), 19 pages.
"Non-Final Office Action", U.S. Appl. No. 12/858,558, (Aug. 30, 2012), 10 pages.
"Non-Final Office Action", U.S. Appl. No. 12/868,519, (Feb. 7, 2013), 16 pages.
"Non-Final Office Action", U.S. Appl. No. 12/868,540, (Feb. 22, 2013), 12 pages.
"Notice of Allowance", U.S. Appl. No. 12/858,552, (Apr. 20, 2012), 8 pages.
Burt, Peter J., et al., "A Multiresolution Spline with Application to Image Mosaics", *ACM Trans. Graphics 2*, (Oct. 1983), 20 pages.
Lee, Hyunjoon et al., "Automatic Upright Adjustment of Photographs", *CVPR*. (2012), 11 pages.
Suh et al., "Automatic Thumbnail Cropping and its Effectivenenss", *UIST '03: Proceedings of the 16th annual ACM symposium on User interface software and technology, ACM Press*, New York, NY USA, (Nov. 2003), pp. 95-104.
Wang, et al., "MobiPicture—Browsing Pictured on Mobile Devices", *Proceedings of the eleventh ACM international conference on Multimedia*, (Nov. 2, 2003), pp. 106-107.
Winnemoeller, et al., "U.S. Application as Filed", U.S. Appl. No. 12/858,552, (Aug. 18, 2010), 70 pages.
U.S. Appl. No. 13/219,457, filed Aug. 26 2011, Stephen J Diverdi.
Prusinkiewicz, Przemyslaw; Lindenmayer, Aristid (1990). The Algorithmic Beauty of Plants. Springer-Verlag. Chapter 4, pp. 101-107. ISBN 978-0387972978.
Chen, X., Neubert, B., Xu, Y.-Q., Deussen, O., and Kang, S. B. 2008. Sketch-based tree modeling using markov random field. ACM Trans. on Graphics 27, 5, pp. 1-9.
U.S. Appl. No. 12/039,164, filed Feb. 28 2008, Radomir Mech.
Lloyd S. P.: Least Squares quantization in pcm. IEEE Trans. on Information Theory 28, 2 (1982), pp. 129-137.
Jodoin P. M., Epstein E., Granger-Piche M., Ostromoukhov V.: Hatching by example: a statistical approach. In Proceedings of NPAR 2002, pp. 29-36.
Hertzmann A., Oliver N., Curless B., Seitz S.M.: Curve analogies. In Rendering Techniques 2002: 13th Eurographics Workshop on Rendering, pp. 233-246.
Salisbury M. P., Anderson S. E., Barzel R., Salesin D.H.: Interactive pen-and-ink illustration, In Proceedings of SIGGRAPH 1994, p. 101.
Winkenbach G., Salesin D. H.: Computer generated pen-and-ink illustration. In Proceedings of SIGGRAPH 1994, pp. 91-100.
Deussen O., Hiller S., Van Overveld C., Strothotte T.: Floating points: A method for computing stipple drawings. Computer Graphics Forum 19, pp. 1-3 (2000).
Hertzmann, A., Jacobs, C.E. Oliver, N., Curless, B., Salesin, D.H.: Image Analogies. In Proceedings of SIGGRAPH 2001, pp. 327-340.
Ashikhmin, M.: Synthesizing Natural Textures. In Proceedings of the Symposium on Interactive 3D Graphics 2001, pp. 217-226.
Turk G.: Texture Synthesis on Surfaces. In Proceedings of SIGGRAPH 2001, pp. 347-354.
Wei L. Y., Levoy M.: Fast Texture Synthesis using Tree-structured Vector Quantization. In Proceedings of SIGGRAPH 2000, pp. 479-488.
Efros A. A., Leung T.K.: Texture synthesis by nonparametric sampling. In IEEE Int. Conf. on Computer Vision (1999), pp. 1033-1038.
giggleapps.com review, "Auryn Ink Review," Feb. 10, 2011, pp. 1-4.
Ijiri T., Owada S., Igarashi T.: The sketch L-System: global control of tree modeling using free-form strokes. In Proceedings of 6th International Symposium SmartGraphics 2006, pp. 138-146.
Esch G., Wonka P., Muller P., Zhang E.: Interactive procedural street modeling, SIGGRAPH 2007 Sketches.
Deussen O. and Lintermann, B.: Interactive Modeling of Plants. IEEE Computer Graphics and Applications, 19 (1999), 1, pp. 56-65.
Muller P., Wonka P., Haegler S., Ulmer A., Gool L.V.: Procedural modeling of buildings. ACM Trans. Graph., 25(2006) 3, pp. 614-623.
Wonka P., Wmmer M., Sillion F., Ribarsky W.; Instant architecture. ACM Trans. Graph.,22 (2003), 3, pp. 669-677.
Marketwire.com release, "Auryn Releases "Auryn Ink" Watercolor App; Named One of the Seven Most Innovative iPad Apps o f 2010 by fast Company," Jan. 4, 2011, pp. 1-2.
U.S. Appl. No. 13/565,552, filed Aug. 2, 2012, Elya Shechtman, et al.
Parish Y. I. H., Muller P.; Procedural modeling of cities. In Proceedings of ACM SIGGRAPH 2001, pp. 301-308.
Wong M. T., Zongker D. E., Salesin D. H.; Computer-generated floral ornament. In Proceedings of SIGGRAPH 1998, pp. 423-434.
Barnes, C., Shechtman, E., Finkelstein, A., and Goldman, D. B. 2009. PatchMatch: a randomized correspondence algorithm for structural image editing. In ACM SIGGRAPH 2009 Papers (New Orleans, Louisiana, Aug. 3-7, 2009). H. Hoppe, Ed. SIGGRAPH '09. ACM, New York, NY, pp. 1-11.
Prusinkiewicz P., James M., Mech R.; Synthetic topiary. In Proceedings of ACM SIGGRAPH 1994, pp. 351-358.
Mech R., Prusinkiewicz P.; Visual models of plants interacting with their environment. In Proceedings of ACM SIGGRH 1996, pp. 397-410.

(56) References Cited

OTHER PUBLICATIONS

Muller M., Heidelberger B., Teschner M., Gross M.: Meshless deformations based on shape matching. ACM Transactions on Computer Graphics, 24, 3 (2005), pp. 471-478.

Barla P., Breslav S., Thollot J., Sillion F., Markosian L.; Stroke Pattern Analysis and Synthesis. Computer Graphics Forum, 25 (3), pp. 663-671, 2006.

iTunes Preview, "Auryn Inc. Auryn ink," Jul. 20, 2011, downloaded at http://itunes.apple.com/us/app/auryn-Auryn\%20Ink/id407668628, pp. 1-2.

U.S. Appl. No. 12/858,546, filed Aug. 18, 2010, Winnemoeller Et al.

Jonathan Duran, Deco tool and Spray Brush for creating complex, geometric patterns in Flash http://www.adobe.com/devnet/flash/articles/deco_intro.html Feb. 2, 2009, pp. 1-19.

L. Shapira, A. Shamir, and D. Cohen-Or. Image appearance exploration by model based navigation. In Computer Graphics Forum, Eurographics, 2009. (Mar. 30-Apr. 3, 2009) pp. 1-10.

Igarashi, T. and J.F. Hughes, A Suggestive Interface for 3D Drawing, in Proceedings of the ACM Symposium on User Interface Software and Technology, UIST 01. 2001, ACM: Orlando, Florida. pp. 1-9.

J. Marks, B. Andalman, P.A. Beardsley, and H. Pfister et al. Design Galleries: A General Approach to Setting Parameters for Computer Graphics and Animation. In ACM Computer Graphics (SIGGRAPH '97 Proceedings), pp. 389-400, Aug. 1997.

Sims, K. Artificial Evolution for Computer Graphics. Computer Graphics 25, 4 (Aug. 1991), pp. 319-328.

U.S. Appl. No. 12/857,382, filed Aug. 16, 2010, Mech Et al.

U.S. Appl. No. 13/219,453, filed Aug. 26, 2011, Diverdi Et al.

U.S. Appl. No. 13/029,036, filed Feb. 16, 2011, Adobe Systems Incorporated, all pages.

U.S. Appl. No. 13/219,848, filed Aug. 26, 2011, Adobe Systems Incorporated, all pages.

O. Deusen et al., "The Elements of Nature: Interactive and Realistic Techniques," ACM SIGGRAPH 2004 Course Note #31, Aug. 2004, pp. 1-63.

Ando, R., & Tsuruno, R. (2010). Vector fluid: A vector graphics depiction of surface flow. In NPAR '10: Proceedings of the 8th International Symposium on Non-photorealistic Animation and Rendering (pp. 129-135). New York, NY, USA: ACM, pp. 1-7.

Ando, R., & Tsuruno, R., Vector graphics depicting marbling flow. In Computers & Graphics, vol. 35, Issue 1, Feb. 2011, pp. 148-159.

Siu Hang Chu, "Making Digital Painting Organic," PhD thesis, Hong Kong University of Science and Technology, Aug. 2007, pp. 1-126.

Tom Van Laerhoven, "An Extensible Simulation Framework Supporting Physically-based Interactive Painting," PhD thesis, University of Limburg, Jun. 21, 2006, pp. 1-171.

Corel, "Corel Painter 11 Features," from the WayBackmachine, May 26, 2011, pp. 1-3.

Corel, "Corel Painter 11 Overview," from the WayBackMachine, May 26, 2010, pp. 1-3.

Chris McVeigh, "ArtRage Studio Pro 3 review", PCWorld, Feb. 12, 2010, pp. 1-4.

Ambient Design, "Artrage 3," http://www.ambientdesign.com/, from web.archive.org, May 25, 2010, ArtRage home page, p. 1.

"Corrected Notice of Allowance", U.S. Appl. No. 12/858,558, Jun. 26, 2014, 2 pages.

"Notice of Allowance", U.S. Appl. No. 12/858,558, Apr. 10, 2014, 9 pages.

\* cited by examiner

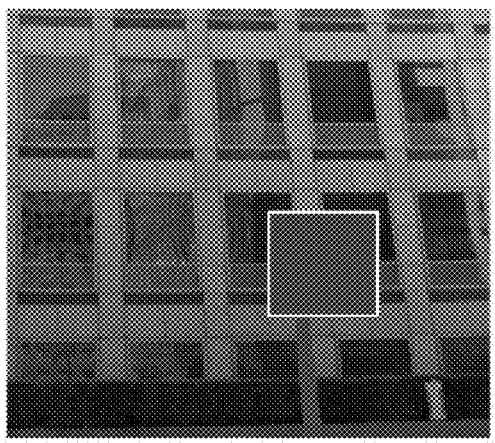
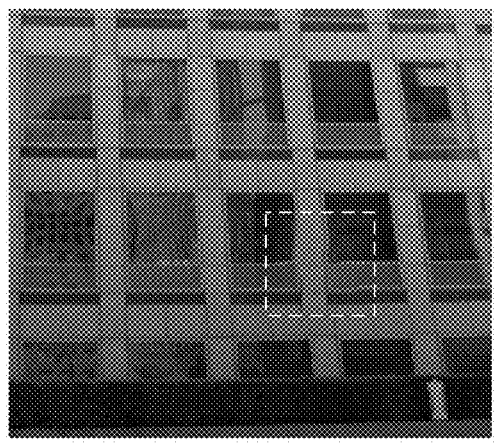
FIG. 6A　　　　　　　　　FIG. 6B
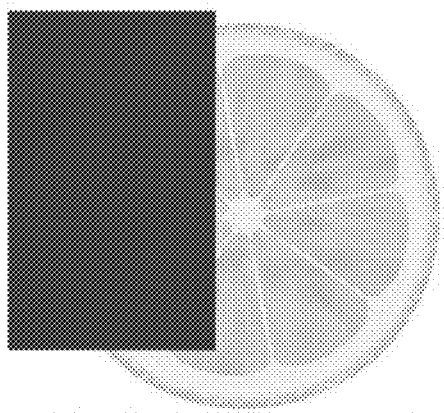
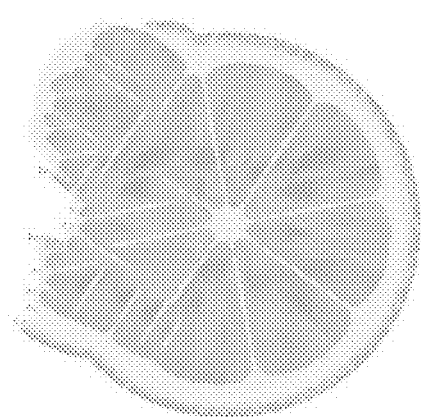
FIG. 7A　　　　　　　　　FIG. 7B
FIG. 8A　　　　　　　　　FIG. 8B

*for each scale:*

*for each scale:*

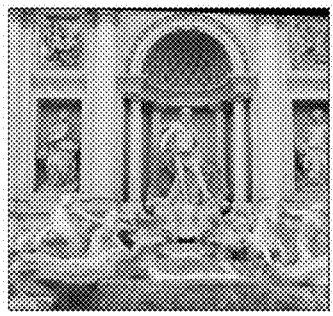
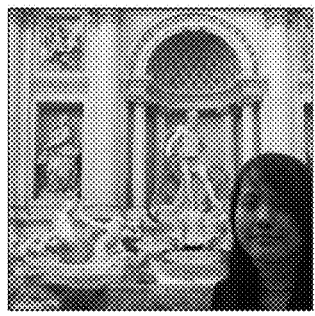
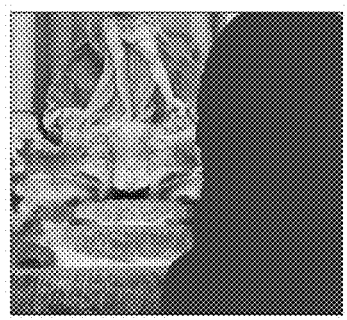
FIG. 23A  FIG. 23B  FIG. 23C
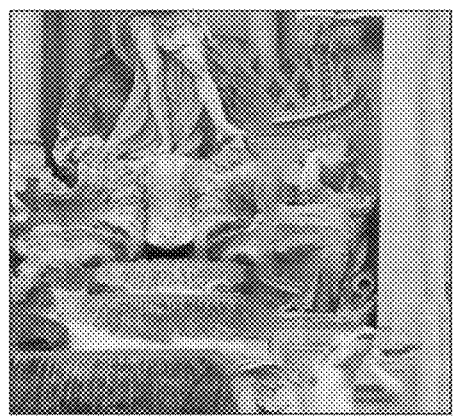
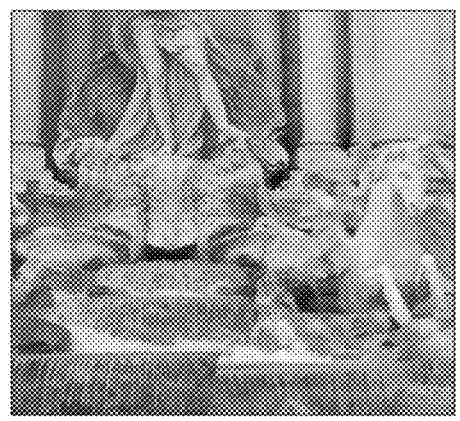
FIG. 23D  FIG. 23E
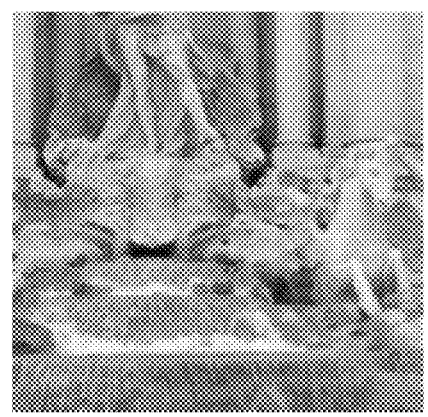
FIG. 23F  FIG. 23G

PATCH-BASED SYNTHESIS TECHNIQUES

PRIORITY INFORMATION

This application claims benefit of priority of U.S. Provisional Application Ser. No. 61/528,601 entitled "GENERALIZED PATCH-BASED SYNTHESIS" filed Aug. 29, 2011, the content of which is incorporated by reference herein in its entirety.

BACKGROUND

Description of the Related Art
Patch-based Synthesis

Patch-based synthesis methods have become a popular tool for image and video synthesis and analysis. Applications include texture synthesis, image and video completion, retargeting, image reshuffling, image stitching, new view synthesis, morphing, denoising and more.

SUMMARY

Various embodiments of methods, apparatus, and computer-readable storage media for providing patch-based synthesis are described. A patch matching technique is described that provides an extended patch search space that encompasses geometric and photometric transformations, as well as gradient domain features. The geometric transformations may include translation, rotation, reflection, uniform scale (referred to herein as simply a scale transform), and non-uniform scale. The photometric transformations may include searching over gain and bias metrics to handle brightness and contrast differences between source and target images or regions of an image. Combinations of two or more transformations (e.g., scale and reflection, non-uniform scale and bias, rotation and gain, reflection, gain, and bias, etc.) may also be included in the search space. Combining these various geometric and photometric transformations may, for example, allow embodiments to better handle source and destination regions (patches) with different color, contrast and/or geometric characteristics than do conventional techniques.

Patch-based image synthesis techniques as described herein may leverage the extended patch search space in various image synthesis applications. The patch-based image synthesis techniques may also integrate image gradients into the patch representation and replace conventional color averaging with a technique that performs voting for colors and gradients and then solves a screened Poisson equation based on values for colors and gradients when blending patch(es) with a target image. The patch-based synthesis techniques may be applied in a general patch-based synthesis framework that handles inconsistencies within and across image sources.

Embodiments may provide augmented patch-based image synthesis methods by giving the algorithm the freedom to apply additional geometric and photometric variations to the synthesis. In addition, embodiments may integrate image gradient features into an optimization process and thus may combine the strengths of gradient domain blending and patch-based synthesis. Embodiments of the patch-based synthesis techniques may thus provide substantial improvement in applications such as image completion, hole filling with large intra-image variations, hole filling from multiple source images, object cloning, morphing, image blending, image stitching, and panoramic image stitching when compared to conventional techniques.

BRIEF DESCRIPTION OF THE DRAWINGS

FIGS. 6A-6B, 7A-7B, 8A-8B, 9A-9B, and 10A-10B illustrate some example failure cases for conventional patch-based fill methods.

FIGS. 23A through 23G show an example of multi-image hole filling, according to at least some embodiments.

Figure 1:
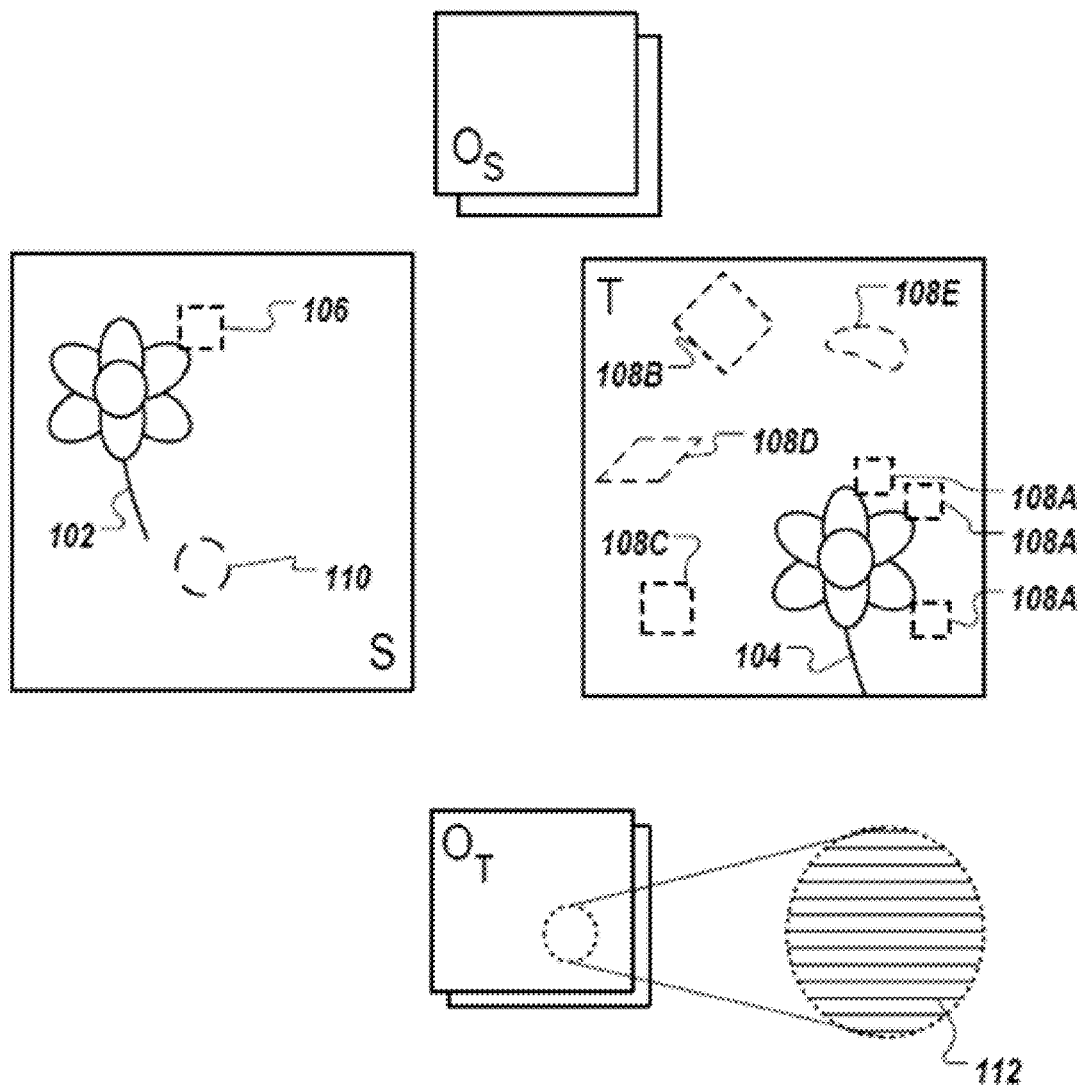
FIG. 1 schematically shows an example system that can determine a correspondence between image regions, according to some embodiments of methods for determining correspondence between image regions.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for providing patch-based synthesis are described. Patch-based synthesis methods including patch matching and patch blending techniques are described that may be applied in image synthesis tasks such as hole-filling, image blending, image stitching, cloning, image morphing, image retargeting, and reshuffling.

A patch matching technique is described that provides an extended patch search space that encompasses geometric and photometric transformations, as well as gradient domain features. The geometric transformations may include, but are not limited to, translation, rotation, reflection, uniform scale (referred to herein as simply a scale transform), and non-uniform scale. The photometric transformations may include, but are not limited to, searching over a range of gain and bias parameters to handle brightness and contrast differences between source and target images or regions of an image. In at least some embodiments, the patch matching technique may search over combinations of two or more transformations, for example by applying both reflection and gain transformations to a given source patch, or by applying non-uniform scale, bias, and gain transformations to a given source patch.

A patch-based synthesis technique is described that is based on a framework that iteratively performs a search of source patches in the extended patch search space using the patch matching technique to identify transformed source patches in source image(s) that best match target patches in the target image, and a voting technique that applies the transformed source patch(s) to the target image. A patch may be defined as a region in an image, of fixed or varying shape. As a non-limiting example, patches may be fixed-shape 5×5 or 7×7 (in pixels) squares. A transformed patch is a patch to which one or more transformations have been applied. The patch-based image synthesis techniques may also integrate image gradients into the patch representation and replace conventional color averaging with a technique that performs voting for colors and gradients and then solves a screened Poisson equation based on values for colors and gradients when blending image data (e.g., colors) from the transformed source patch(es) with a target image.

Embodiments of the patch-based synthesis techniques may apply the extended search space provided by the patch matching technique to various image synthesis applications, for example hole-filling, object cloning, and image stitching. Using the patch matching techniques described herein, the patch-based synthesis techniques may extend the search space for similar patches to one or more of rotation, uniform and non-uniform scale, reflection, color, and gradients, and combinations thereof, and may combine a voting step with gradient domain blending techniques. Embodiments may provide augmented patch-based image synthesis methods by giving the algorithm the freedom to apply more geometric and photometric variations than in conventional techniques. Extending the search space for source patches may also allow embodiments to better utilize multiple images as sources for patches than do conventional techniques, as differences between images (e.g., color, brightness, and contrast differences, as well as geometric differences) may be compensated for by the extended transformations. In addition, embodiments may integrate gradient features into the optimization process and thus combine the strengths of gradient domain blending and patch-based synthesis. Embodiments of the patch-based synthesis techniques may thus provide substantial improvement in applications such as hole filling with large intra-image variations, hole filling from multiple images, object cloning, and stitching challenging panoramas when compared to conventional techniques.

Embodiments of the patch matching techniques and patch-based synthesis techniques may extend patch-based synthesis to handle more transformations than in conventional techniques, and may provide additional features, capabilities, and applications, for example as described below.

Geometric transformations—In conventional patch-based synthesis techniques, the search for patches is conducted only over the space of translations. Embodiments of the patch-based synthesis techniques described herein may add rotation, uniform scale, non-uniform scale, and reflection to the search space. These additional geometric transformations may address one or more of, but not limited to:

Misaligned edges—Misaligned edges are hard to handle in conventional patch-based synthesis techniques. As an example, take the simple disconnected line in 1D. If there is only the option to translate lines to fill the hole, the intersection will be either blurry or jaggy. By applying rotation and/or other geometric transformations as described herein, embodiments may easily connect these two lines.

Obvious repetitions—By rotating and scaling the patches, embodiments may expand the number of patches available for synthesis, and therefore may reduce artifacts due to repetition of cloned patches. Also, when repetitions do occur, slight geometric transformations may make it harder for the user to perceive the repetition because it is harder for humans to detect rotated and scaled copies than it is to detect simple translated copies.

Symmetry—Using reflection enables embodiments to improve the quality of the synthesis when symmetric objects are depicted in the input image.

Photometric transformations—To handle brightness and contrast differences between source and target images or regions of an image, at least some embodiments of the patch-based synthesis techniques may search over the space of gain and bias per patch, and at the synthesis (blending) phase may adjust the colors of a source patch to better match colors of the target image according to the recovered gain and bias parameters.

Including gradients in the objective function—At least some embodiments may integrate gradient features into the optimization process, and thus may combine the strengths of gradient domain blending with patch-based synthesis. With this addition, embodiments may, for example, perform hole filling under smoothly varying color and texture where conventional patch-based synthesis techniques may fail.

Hole filling from multiple images—Because embodiments are able to compensate for rotation, scale and color differences, at least some embodiments may be configured to fill holes in one image using source content from a collection of two or more other source images, for example a set of images in a database or a set of layers in an image.

Stitching different images—At least some embodiments may provide a framework that can produce smooth transition from one object to another by synthesizing new textures. This ability may be applied, for example, in an image stitching technique to stitch different objects and/or different images together.

Embodiments of the patch matching techniques described herein may leverage and extend the patch matching technology as described in Barnes, C., Shechtman, E., Finkelstein, A., and Goldman, D. (2009), PatchMatch: A randomized correspondence algorithm for structural image editing, *Association of Computing Machinery (ACM) Transactions on Graphics* (Proceedings of SIGGRAPH); and Barnes, C., Shechtman, E., Goldman, D., and Finkelstein, A. (2010), The generalized patchmatch correspondence algorithm, *European Conference on Computer Vision (ECCV)*. FIGS. 1 through 5 and the following section, titled *Determining Correspondence Between Image Regions*, broadly illustrate and describe these patch matching techniques for determining correspondence between image regions, i.e. patches. Later in this document, in a section titled *Generalized patch-based synthesis*, embodiments of patch matching techniques and patch-based synthesis techniques are described that leverage and extend the technology described in Barnes, et al. (2009), Barnes, et al. (2010), and in the section Determining Correspondence Between Image Regions to handle more transformations than in conventional patch-based synthesis techniques, and to provide additional features, capabilities, and applications, for example as described above. In addition, additional Figures and discussion are provided that, for example, compare conventional techniques to the patch-based synthesis techniques described herein. In particular, the section titled *Generalized patch-based synthesis* describes embodiments of a content-aware synthesis method that may be implemented to apply the features and capabilities of the patch matching techniques and patch-based synthesis methods described herein to tasks such as filling holes or regions in images, for example regions occluded by an undesirable object, using patches located in the same image and/or in one or more other images according to the patch searching techniques that leverage geometric and photometric transformations described herein.

Determining Correspondence Between Image Regions

This section describes methods for determining correspondence between image regions, as illustrated in FIGS. 1 through 5.

FIG. 1 provides examples of determining correspondences between image regions, according to at least some embodiments. Referring to FIG. 1, S and T represent images stored in any of a number of different formats, such as a pixel-based format where the images S and T are made up of the same or different numbers of pixels. In some implementations, it may be useful to determine a correspondence between one or more regions of the image S and the image T. For example, it may be useful to determine whether for image content 102 (e.g., a flower) in the image S there is any corresponding image content 104 in the image T. As another example, a correspondence between two or more regions of a single image, for example two or more regions within the image S, may need to be determined. Regions can include dense subsets of the total number of pixels that make up the entire image.

A patch may be defined as a region in an image, of fixed or varying shape. As a non-limiting example, patches may be defined as fixed-shape 5×5 or 7×7 squares. In some implementations, a goal is to find, for each of patch 106 in the image S, one or more corresponding patches 108A-C in the image T under a patch distance function. In some implementations, one can search over a space of offsets into the target image (e.g., the image T), rather than over the space of patches in the target image. For example, a notation can be used such that a patch P in the image S is defined as P=S(i,j), namely the patch in the image S having its upper left corner at column i and row j of the pixels in the image S. A patch T(k,l) in the image T can be similarly defined. In some implementations, an offset between patches S(i,j) and T(k,l) can be defined as (k−i, l−j). For example, if the two images S and T were identical, the best mapping from S to T when translation without warping is performed can be expressed as:

$$\arg\min_{k,l}(D[S(i,j),T(k,l)])=(k-i,l-j)$$

for all (i,j) and (k,l), where D is a patch distance function.

One or more offset objects $O_S$ and one or more offset objects $O_T$ can be defined. Here, $O_S$ is the current offsets (k−i, l−j) determined for all patches S(i,j). Similarly, $O_T$ is the current offsets (i−k, j−l) determined for all patches T(k,l). The offsets can be termed a nearest-neighbor field $f$ such that:

$$f: R^2 \mapsto R^2.$$

The nearest-neighbor field $f$ can be improved using a randomized patch-matching algorithm that is performed for a predefined number of iterations or until convergence. Initial offsets for all patches are defined as a starting point, and in each iteration the algorithm seeks to improve every offset using two sets of candidates: propagation candidates and random-search candidates. The propagation candidates for offset $f(x, y)$ are the known offsets above or to the left ($f(x−1, y)$ and $f(x, y−1)$). On alternating iterations, propagation can instead be done in reverse scan order, such that offsets below and to the right are examined. Generally, a propagation candidate that provides a smaller patch distance D should replace the current offset.

The random search can be performed to prevent the evaluation of propagation candidates from ending up in a local minimum. The random-search candidates are sampled from an exponential distribution relative to the current offset (e.g., offsets located at an exponentially decreasing distance from the current offset in a random direction). The current offset is replaced if the random-search candidate has a smaller patch distance D.

In some implementations, the offsets can be stored in images of the same size as the images S and T. For example, a pixel $O_S(i,j)$ contains the current offset (k−i, l−j) such that the corresponding patch Q in the image T is found at coordinate (k,l). In some implementations, the algorithm can proceed by iteratively improving the estimates $O_S$ and $O_T$ so that they approach:

$$\min_{Q \in T} D(P,Q) \text{ and } \min_{P \in S} D(Q,P)$$

in the limit.

Any distance function can be used. Some implementations can use common distance functions for natural images and/or other data sources including video and three-dimensional shapes, such as an $L_p$, $L_1$, or clamped $L_2$, etc., or any other scalar function.

When searching for similar image regions for a current patch, it may be desirable to search also for patches that after being warped are similar or identical to the current patch. In some implementations, the similarity search is first performed with the target patches in an unaltered (i.e., not yet warped) state, and the candidate matches are registered. Thereafter, one or more warping actions are applied to the candidate matches and a search is performed for any patches that, after being warped, are similar to the current patch. Any type of warping can be used that allows parameterization over one or more warping parameters. In some implementations, the candidate patches can be warped using one or more warping actions of: rotation, scaling, transformation (e.g., affine or polar), homography, and combinations thereof. In some implementations, as another example, the candidate patches can remain unaltered (not warped), while instead the current patch is warped, before making a similarity measurement between the two registered patches.

As a first example of warping, arbitrary rotating and/or scaling can be performed in the process of seeking matching patches. In some implementations, rotating and/or scaling is used in applications such as object detection, denoising or super-resolution, where it may be desirable to match patches across a range of one or more possible warping actions, such as rotations and/or scales. For example, a patch 108B in T is here rotated around its center, a patch 108C in T is scaled, a patch 108D is transformed, and a patch 108E is warped, all compared to the other patches 108A.

To search a range of rotations $\theta \in [\theta_1, \theta_2]$ and a range of scales $s \in [S_1, S_2]$, a patch-matching algorithm is created that has a search space of $(x, y, \theta, s)$. For example, this can be done by extending an algorithm that has the $(x, y)$ search space with parameters for additional search dimensions. That is, the matching algorithm can be characterized as a function $f$ such that:

$$f: R^2 \mapsto R^4.$$

The function $f$ can be initialized by uniformly sampling from the range of possible positions, orientations and scales. In the propagation phase, the relative offsets between pixels $(\Delta_x, \Delta_y)$ can be transformed using a transformation matrix $T(\theta, s)$. In the random search phase, a sampling window of exponentially decreasing size can be used, and all four dimensions of the search space can be contracted around the current state.

Similarly, when using any other warping action(s) on the patches, the patch-matching algorithm can be defined to have a search space that includes one or more dimensions for the corresponding warping parameter(s). For example, when the warping involves affine transformation, the action can be parameterized in terms of a linear transformation (e.g., amount(s) of rotation, scaling or shear) and a translation (e.g., amount of shift). As another example, when the warped candidate patch is a homography of the unwarped candidate patch, then rotation and translation parameters are defined, optionally with one or more additional parameters, such as a camera projection matrix.

Any warping action can be represented by a warping object $W_S$ in analogy with the offset object $O_S$ mentioned above. That is, $W_S(i,j)$ can represent the warping action(s) currently associated with the patch at (i,j). Similarly, a warping object $W_T$ corresponds to the offset object $O_T$.

Figure 2A:
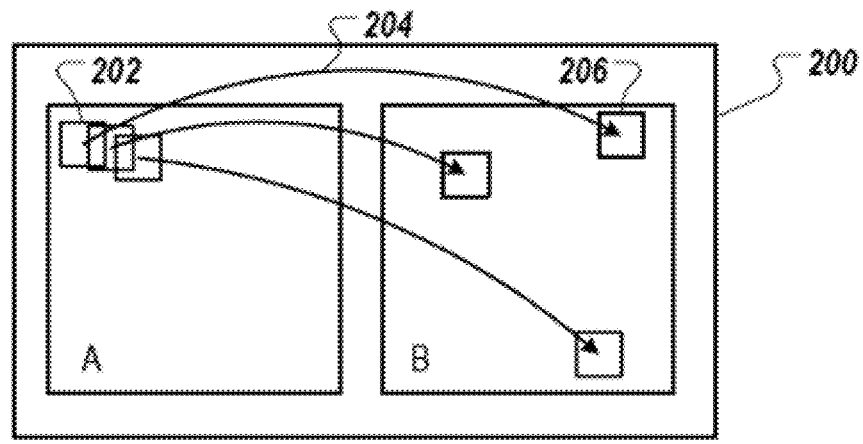
FIGS. 2A through 2C show examples of mappings between image regions, according to some embodiments of methods for determining correspondence between image regions.
Figure 2B:
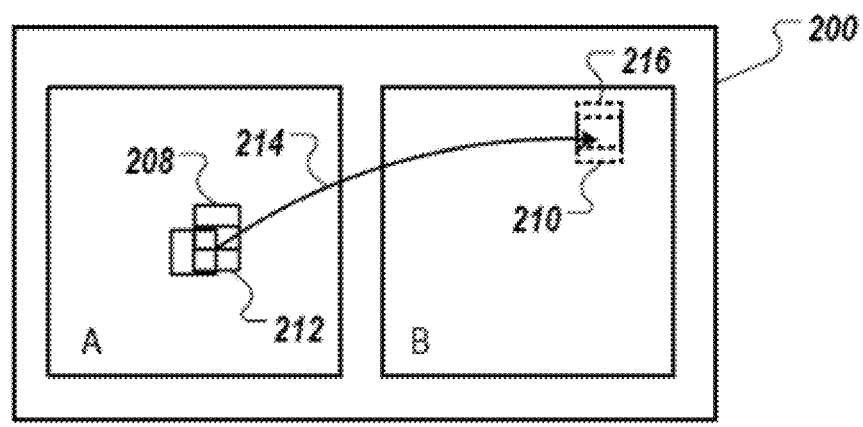
Figure 2C:
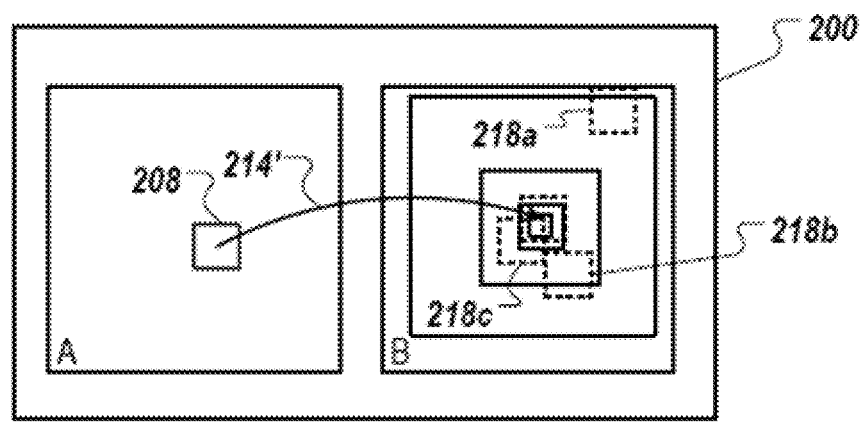

FIGS. 2A through 2C show examples of mappings between image regions. In FIG. 2A, an image realm 200 includes images A and B. A patch 202 is located in a region of the image A. The patch 202 is associated with one or more mappings 204 to another image region. In some situations, this mapping represents an initial guess of what image region(s) best correspond to the patch 202, for example using the offset vectors mentioned above. For example, the other image region(s) can be located in the image B, such as the region(s) represented by one or more patches 206. The patch(es) 206 can correspond to any or all of the patches 108A-C discussed above; that is, the patch(es) 206 can include a rotated patch (cf. patch 108B), a scaled patch (cf. patch 108C), a non-rotated and non-scaled patch (cf. patch 108A), or combinations thereof. Each patch in the image A can have one or more mappings associated with it. A mapping can be improved in one or more iterations, for example as will now be described.

In some implementations, a propagation phase can be carried out as schematically illustrated in FIG. 2B. For example, assume that a patch 208 in the image A has been mapped to one or more patches 210 in the image B, the mapping(s) not shown in the figure for clarity. Neighbors of the patch 208 can now be evaluated to determine what mappings they have, and whether any of these mappings can be applied to the patch 208 for a better result. In some implementations, the offset vectors mentioned above can be used. For example, the algorithm can look at the offset vectors of neighboring or nearby patches, and use one of these offset vectors if it provides a better result. In some implementations, an algorithm can look at the four immediately adjacent pixels, or all pixels in a circular or square neighborhood of diameter 2 or 4, and/or any subset of the pixels within a fixed distance of the pixel at which propagation occurs, to name just a few examples. Here, for example, it may be determined that if one applies the mapping of a patch 212, then the patch 208 can be provided with a mapping 214 to a patch 216, which has a better correspondence to the patch 208 than the earlier mapping to the patch 210. The term propagation indicates that good mappings for one patch can be propagated to neighboring patches to improve their mappings. Thus, for example, if a local maximum of correspondence exists in mappings of a neighborhood around the patch 208, it can be detected in the propagation phase.

In some situations, the propagation phase may not find the globally best mapping. A perturbation such as a random-search phase can therefore be used as schematically illustrated in FIG. 2C. Here, the patch 208 initially has a mapping 214', for example resulting from the propagation phase. One or more randomly selected mappings can then be evaluated. For example, patches 218A, 218B and 218C can be randomly selected in the image B. In some implementations, the patches 218A-C are selected to have gradually increasing or decreasing distance from the location of the original mapping target in the image B. For example, a random distribution can be used that includes nearby locations (e.g., the patch 218A) and locations further away (e.g., the patch 218C), wherein the distribution places more weight in the distribution function on distances of nearby locations than would be obtained from uniform sampling. In some implementations, an algorithm can sample at uniform from the entire image with probability ½, and sample from a circle with small radius around the current mapping with probability ½, giving a random distribution where smaller distances are preferentially selected, and/or sample according to a Gaussian distribution around the current mapping, to preferentially select smaller distances. As another example, the probability density function can be generally decreasing, meaning that it does not have to be monotonic, but generally decreases as radius increases. In some implementations, the random search can be performed by sampling only those points whose distance is within an exponentially decreasing threshold from the mapping of the first patch. The patches 218A-C can be evaluated to determine whether a better correspondence with the patch 208 can be achieved using a randomly selected patch.

Figure 3:
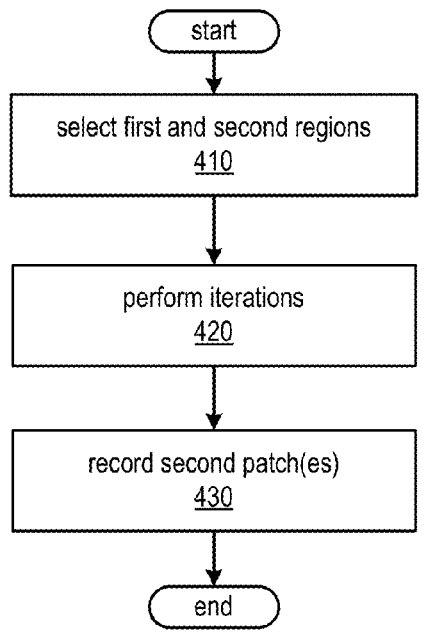
FIGS. 3 through 5 show flowcharts of example methods for determining correspondence between image regions, according to some embodiments.
Figure 4:
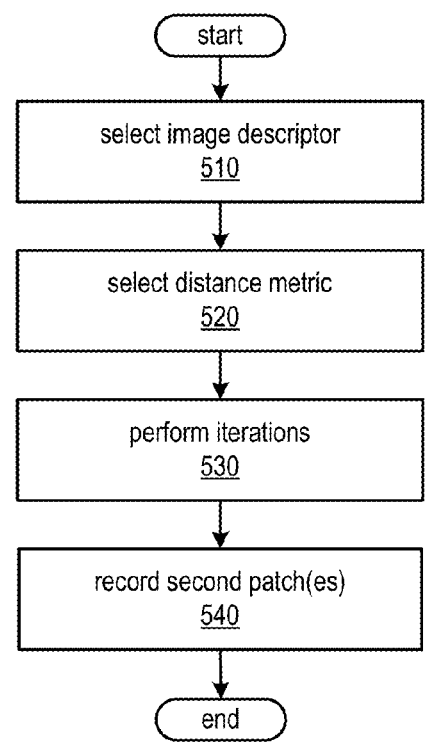
Figure 5:
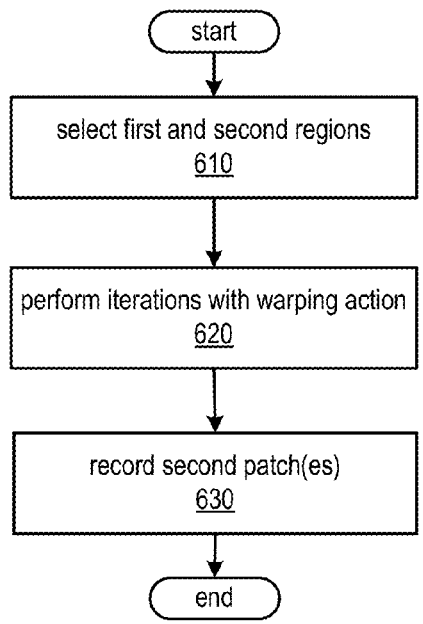

FIGS. 3 through 5 show flowcharts of example methods for determining correspondence between image regions, according to some embodiments. In some implementations, more or fewer steps can be performed, and/or one or more steps can be performed in a different order.

The method illustrated in FIG. 3 relates to determining correspondence between image regions. As indicated at 410 first and second regions of visual content including pixels are selected. The first region includes a first patch to be mapped to the second region. For example, referring to FIG. 1, the regions corresponding to the patch 106, and to one or more of the patches 108A-C, can be selected. As indicated at 420, iterations are performed to find mappings for the first patch. The iterations may include nearby-pixel mapping evaluation and random-perturbation mapping evaluation. As indicated at 430, second patches in the second region found using the iterations are recorded.

The method illustrated in FIG. 4 relates to determining correspondence between image regions using a selected image descriptor and/or distance metric. As indicated at 510, an image descriptor is selected for first and second regions. The first region includes a first patch to be mapped to the second region. In some implementations, a descriptor of 7×7 patches is used. As indicated at 520, a distance metric for evaluating mappings for the first patch is selected. For example, the distance metric can be selected from the $L_2$ norm; a modified $L_2$ distance that involves correction for limited changes in lighting by normalizing the mean and standard deviation in luminance to be equal; or any other algorithm that supplies a total ordering, with the implicit assumption that patches with close spatial proximity should also be more likely to have similar offsets for their best nearest-neighbors. As indicated at 530, iterations are performed to find the mappings for the first patch, the iterations including nearby-pixel mapping evaluation and random-perturbation mapping evaluation. The iterations use the selected image descriptor and the selected distance metric. As indicated at 540, at least one second patch in the second region found using the iterations is recorded.

The method illustrated in FIG. 5 relates to determining correspondence between image regions using one or more warping actions. For example, the warping can involve one or more of scaling, rotation, transformation, homography, and combinations thereof. As indicated at 610, first and second regions of visual content including pixels are selected. The first region comprises a first patch to be mapped to the second region. For example, the regions corresponding to the patch 106, and to one or more of the patches 108A-C, can be selected. As indicated at 620, iterations are performed to find mappings for the first patch, the iterations including nearby-pixel mapping evaluation and random-perturbation mapping evaluation. A warping action is performed on the candidate patch in at least one of the iterations. For example, the patch 108B and/or the patch 108C (FIG. 1) can be used. As indicated at 630, at least one other patch in the second region found using the iterations is recorded.

Generalized Patch-Based Synthesis

This section describes embodiments of generalized patch matching techniques and generalized patch-based synthesis techniques that leverage and extend the methods described in the above section titled *Determining Correspondence Between Image Regions*. The patch-based synthesis techniques described herein, using the patch matching techniques that extend the search space for patches in both the geometric and photometric domains, may handle more transformations than do conventional patch-based synthesis techniques, and may provide additional features, capabilities, and applications, for example geometric transformations, photometric transformations, gradient domain blending, hole filling from multiple images, and image stitching. This section also describes embodiments of a content-aware synthesis method that may be implemented to apply the features and capabilities of the patch matching techniques and patch-based synthesis methods described herein to tasks including but not limited to filling holes or regions in images, for example regions occluded by an undesirable object, using patches located in the same image and/or in one or more other images according to the patch searching techniques and transformations described herein. In addition, Figures and discussion are provided that, for example, compare conventional techniques to the patch-based synthesis techniques described herein.

Figure 26:
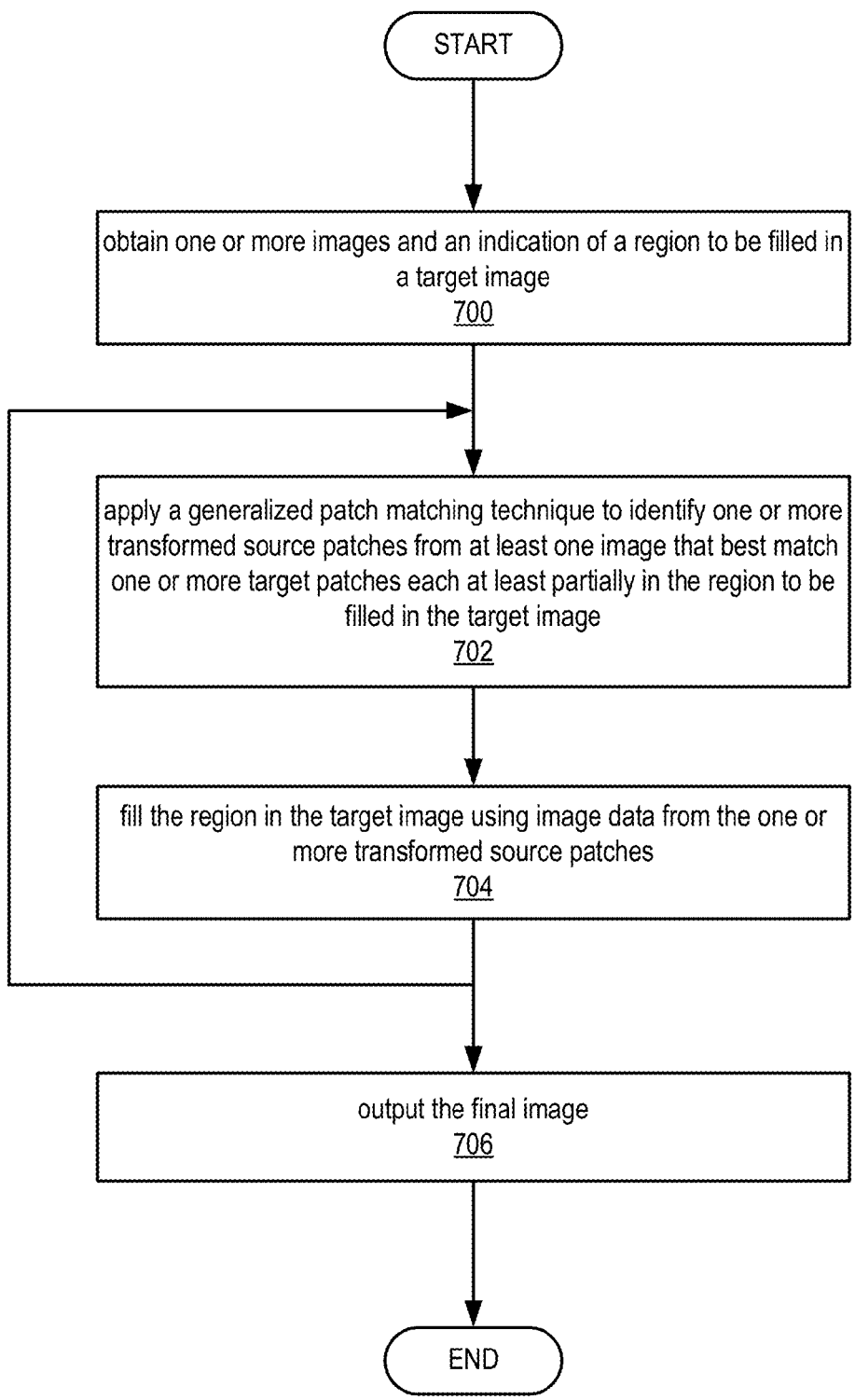
FIG. 26 is a high-level flowchart of a content-aware synthesis method that implements patch-based synthesis techniques, according to at least some embodiments.

FIG. 26 is a flowchart that broadly describes a content-aware synthesis method, according to at least some embodiments, and is not intended to be limiting. As indicated at 700, one or more source images and an indication of a region to be filled in a target image may be obtained. As indicated at 702, a patch matching technique as described herein may be applied to identify one or more transformed source patches in at least one source image that best match one or more destination (or target) patches each at least partially in the region to be filled in the target image (a target patch may overlap the image outside the fill region and the region itself). The patch matching technique may employ one or more geometric transformations and/or one or more photometric transformations, and combinations of the transformations, as described herein to identify the one or more transformed source patches according to geometric properties and/or photometric properties of the patches. In at least some embodiments, the patch matching technique may identify transformed source patches according to gradient information instead of or in addition to the geometric and/or photometric criteria. The geometric transformations may include, but are not limited to, translation, and one or more of rotation, reflection, scale, and non-uniform scale. The photometric transformations may include, but are not limited to, gain and bias.

As indicated at 704, the method may fill the region in the target image using image data from the one or more transformed source patches. In at least some embodiments, filling the region in the target image may involve applying one or more geometric operations and/or one or more photometric operations to the source patches to adjust (or transform) the source patches to properties of the target image, thus generating the transformed source patches. In at least some embodiments, filling the region in the target image may also involve applying a gradient domain blending technique that may smooth texture when blending source image data from the transformed source patches with image data in the target image.

As indicated by the arrow returning from element 704 to element 702, the method may iteratively perform searching for source patches and blending of the located transformed source patches to perform the image synthesis task (e.g., hole filling). As indicated at 706, once the synthesis task (e.g., hole filling) is complete, the method may output the final image.

The following (Algorithm 1) is example pseudocode for a content-aware synthesis method that incorporates the patch matching technique and patch-based synthesis technique described herein, according to at least some embodiments, and is not intended to be limiting. In conventional patch-based synthesis techniques, the search for patches was conducted only over the space of translations. The content-aware synthesis methods described herein incorporate geometric transformations, photometric transformations, and gradient feature handling not provided in those conventional techniques. Embodiments of the content-aware synthesis method may add geometric transformations including rotation, uniform scale, non-uniform scale, and reflection spaces to the search space. In addition, to better handle brightness and contrast differences, at least some embodiments may search over the space of gain and bias per patch, and at the synthesis phase may adjust the colors according to the recovered gain and bias parameters. At least some embodiments may integrate gradient features into the optimization process, and thus may combine the strengths of gradient domain blending with patch-based synthesis. With these additions, embodiments may, for example, perform hole filling under smoothly varying color and texture where conventional patch-based synthesis techniques may fail. The ability to compensate for rotation, scale and color differences may enable at least some embodiments to fill holes in one image using source content from a collection of other source images, for example a set of images in a database or a set of layers in an image. Furthermore, at least some embodiments may provide a framework that can produce smooth transitions from one object to another by synthesizing new textures. This ability may be applied, for example, in an image stitching technique to stitch different objects and/or different images together.

Algorithm 1 - Example content-aware synthesis method

Input: input image $I_{orig}$ and input mask that indicates hole pixels to be synthesized
Output: final image with filled hole pixels
1. Down-sample input image and input mask to scale $s_0$ : I and H correspondingly
2. Set initial guess for hole colors in I by a smooth interpolation from the hole boundary pixels
3. Compute intensity gradient channels $\nabla I_x$ and $\nabla I_y$ and add them to the three color channels
4. Generate a full-resolution scale-space pyramid $I_{pyr}$ from image $I_{orig}$
5. for scale s from $s_0$ to 1 with step size m
6.    If s > $s_0$, upscale I to scale s
7.    Create a 2D array A for hole colors (of the dimensions of I with 5 channels) and set A=0
8.    Create a 2D array W for weights (of the dimensions of I with 1 channel) and set W=0.
9.    for Iteration i = 1 to n
10.      for all pixels p in I with coordinate x, y
11.        Extract a patch P around pixel p of size k × k
12.        Use the generalized patch matching techniques with $I_{pyr}$ to find an approximate nearest neighbor patch Q outside the hole with the translation $t_x$, $t_y$ (continuous values), non-uniform scale $t_{sx}$ and $t_{sy}$, orientation $t_o$, reflection $t_r$, color gain $t_g$ and color bias $t_b$ in I (or in a separate image)
13.        Extract the patch Q from $I_{pyr}$ by sampling color values around location $t_x$, $t_y$ and with the transformations $t_{sx}$, $t_{sy}$, $t_o$, $t_r$, $t_g$ and $t_b$
14.        Calculate vertical and horizontal gradients $\nabla I_x$ and $\nabla I_y$ of patch Q
15.        for all coordinates x' from 1 to k and y' from 1 to k
16.           for channel c = {r, g, b, $\nabla I_x$, $\nabla I_y$}
17.              A(x+x', y+y', c) ← A(x+x', y+y', c) + f(x+x', y+y')*Q(x', y', c)
18.              W(x+x', y+y', c) ← W(x+x', y+y') + f(x+x', y+y')
19.           end for
20.        end for
21.      end for
22.      I ← SolveScreenedPoissonEquation(A./W, hole boundary conditions)
23.    end for
24. end for As noted at (12) in the above pseudocode, one or more generalized patch matching techniques may be employed that handle geometric transformations such as reflection, scale, and non-uniform scale, and that may also search according to photometric gain and bias. When measuring the distance between patches, at least some embodiments may also calculate the gradient of each source patch and then compare it with the gradient of the target image patch. In some implementations, to retrieve higher quality patches for synthesis, a bank of pre-filtered images may be created from the original image over multiple scale spaces, for example 10 to 15 scale spaces, and for each scaled patch the best pre-filtered image in which to conduct the search is chosen. In at least some embodiments, the generalized patch matching techniques used at (12) in the above pseudocode may leverage and extend the patch matching technology as described in Barnes, et al., 2009, and Barnes, et al., 2010, and in the section titled Determining Correspondence Between Image Regions.

Discrete screened Poisson technology is described in Bhat, P., Curless, B., Cohen, M., and Zitnick, L. (2008), Fourier analysis of the 2D screened Poisson equation for gradient domain problems, *European Conference on Computer Vision (ECCV)*, and/or in Bhat, P., Zitnick, C. L., Cohen, M., and Curless, B. (2010), Gradientshop: A gradient-domain optimization framework for image and video filtering, *Proceedings of the Association of Computing Machinery (ACM) Transactions on Graphics*.

Figure 17A:
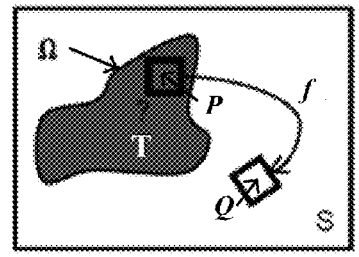
FIGS. 17A and 17B illustrate applying gradients in a patch-based synthesis process, according to at least some embodiments.
Figure 17A:
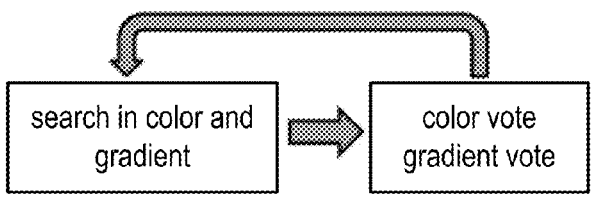
Figure 17B:
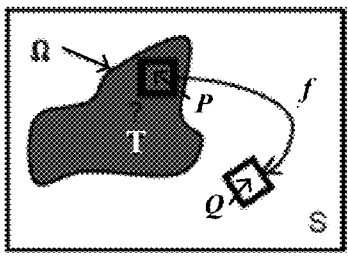
Figure 17B:
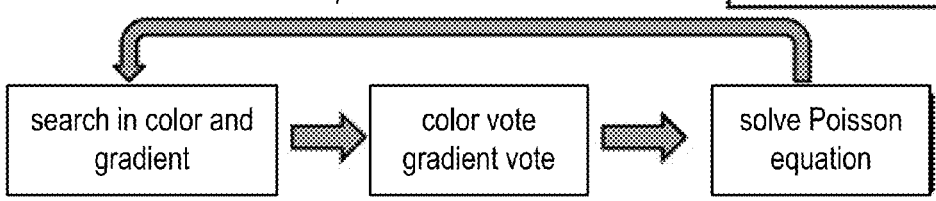

At least some embodiments may add distances between gradients of source and target patches into the energy function being optimized, as shown in FIG. 17A. When solving this least square equation, an optimal solution for the energy function may be to do voting (e.g., averaging) both for colors and gradients, and then solve a screened Poisson equation based on values for colors and gradients, as shown in FIG. 17B. This adjusts the color of the image based on the given gradients, which is simply the average of the gradients from the voting phase. Note, however, that in other embodiments, other methods may be used.

Figure 27:
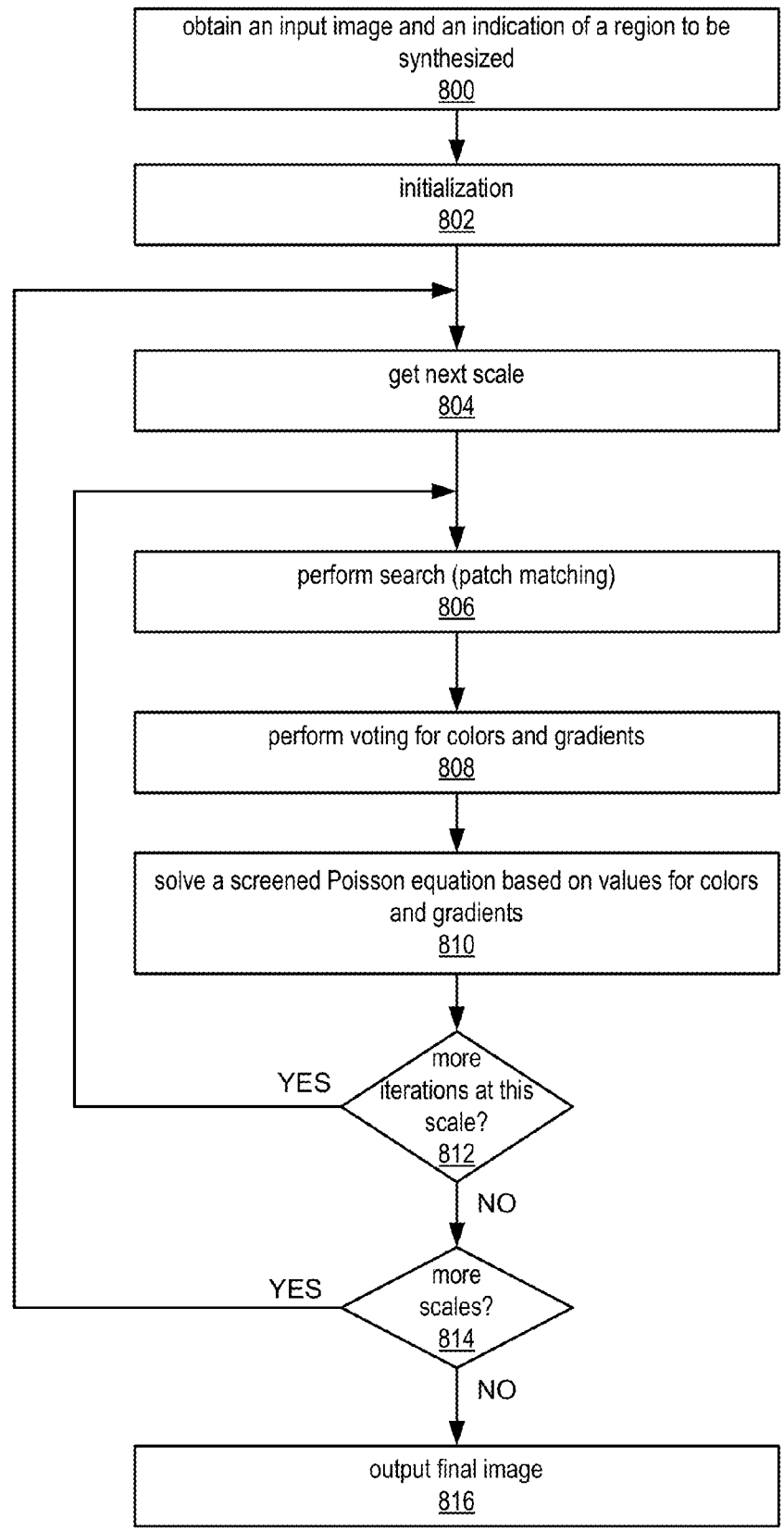
FIG. 27 is a flowchart of a content-aware synthesis framework that implements patch-based synthesis techniques, according to at least some embodiments.
Figure 28:
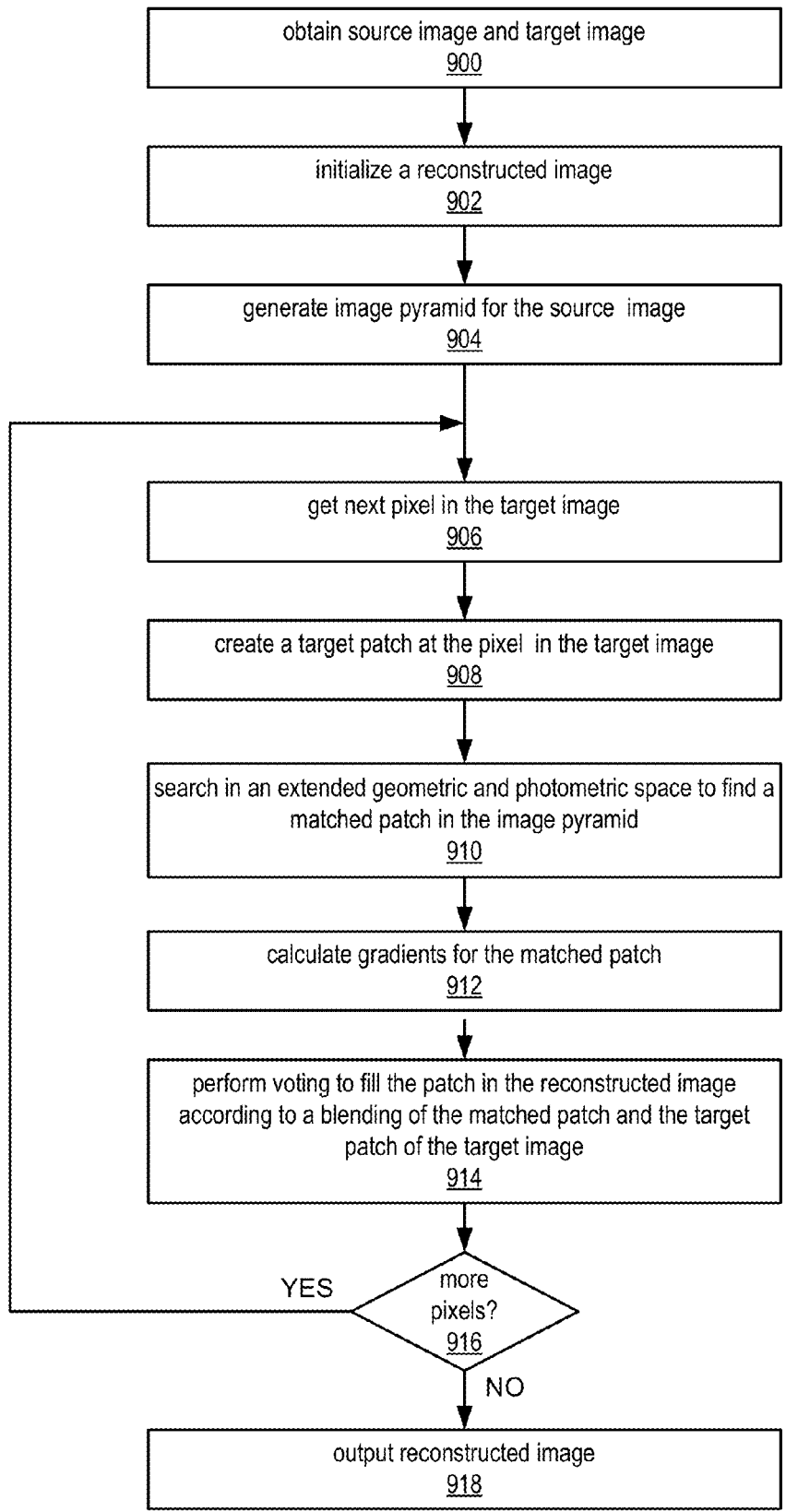
FIG. 28 is a flowchart of a method for generating a reconstructed image that implements a patch matching technique, according to at least some embodiments.

FIGS. 27 and 28 are flowcharts of methods for implementing a content-aware synthesis method, for example as illustrated by Algorithm 1.

FIG. 27 illustrates a content-aware, patch-based image synthesis framework, according to at least some embodiments, and is not intended to be limiting. As indicated at 800, an input image and an indication of a region (e.g., a mask) to be synthesized may be obtained. As indicated at 802, initialization may be performed. In at least some embodiments, initialization may include initializing a target image for results of the synthesis. In at least some embodiments, initialization may include downsampling the input image and mask to a lowest scale. In at least some embodiments, initialization may include computing intensity gradients for the input image and adding them as additional channels (along with the color channels) in the input image. In at least some embodiments, initialization may include generating initial guesses for colors in a region to be synthesized in the input image.

For each scale at which processing is to be performed, the method then iteratively performs searching and voting, as described herein. As indicated at 804, a next scale is obtained. (In at least some embodiments, initially, this will be the lowest scale). In at least some embodiments, if the current scale is greater than the lowest scale, then the image may be upscaled to the current scale. As indicated at 806, a search is performed at the current scale. As indicated at 808, a voting technique is performed according to results of the search 806 to blend the patch(es) into the target image. The voting technique votes on both colors and gradients so that blending is performed in both the color and the gradient domains. An embodiment of a method for performing the search and voting at 806 and 808 is illustrated in FIG. 28. As indicated at 810, the method may solve a screened Poisson equation based on values for colors and gradients generated at elements 806 and 808 to adjust the colors of the image based on the given gradients. For an example screened Poisson equation, see equation 2 below. Discrete screened Poisson technology is further described in Bhat et al. (2008) and/or in Bhat et al. (2010). Output of element 810 is a current version of the target image generated according to the color and gradient components produced by the search and voting steps (elements 806 and 808). At 812, if there are more iterations to be performed at this scale, then the method returns to 806. Otherwise, at 814, if there are more scales to be processed, then the method returns to 804. At 814, if all scales have been processed, then a final image (the final version of the target image) is output at 816.

In at least some embodiments, to implement elements 806 and 808, a method is used that reconstructs a temporary image including color and gradient components according to the source image and the current target image by performing a search step followed by a voting step that votes on both colors and gradients. An example embodiment of a method that may be used is illustrated in FIG. 28.

In embodiments, the method of searching (element 806), voting (element 808) and solving the screened Poisson equation (element 810) combines the benefits of alpha blending and gradient domain methods. First, edges and structures are aligned before blending by a search across geometric variations, and warping the patches accordingly during voting. Second, wide photometric and appearance variations can be matched by the use of a gain and bias per channel as well as matching of gradients. Third, integration of colors and gradients using the screened Poisson equation allows local patch-based edits to propagate globally, leading to smooth and gradual transition of color from one source to another.

FIG. 28 illustrates a method for generating a reconstructed image, according to at least some embodiments. This method may, for example, be used in a content-aware synthesis method, for example to implement elements 806 and 808 of FIG. 27. The method may also be used in other applications, for example in blending two images or in morphing between two images. As indicated at 900, a source image and a target image may be obtained. As indicated at 902, a reconstructed image may be initialized. As indicated at 904, an image pyramid may be generated for the input image. In at least some embodiments, the pyramid is a full-resolution, scale space image pyramid.

For each pixel in the target image, the method then creates a target patch, finds a matched patch for the target patch in the image pyramid, and fills the corresponding region of the reconstructed image according to a blending of the matched patch and the target patch. As indicated at 906, a next pixel in the target image is obtained. As indicated at 908, a target patch is created at the pixel. As indicated at 910, a patch matching technique is then used to find a matched patch in the image pyramid. The patch matching technique may employ one or more geometric transformations and/or one or more photometric transformations as described herein to identify the matched patch according to geometric properties and/or photometric properties. In at least some embodiments, the patch matching technique may identify the matched patch according to gradient information instead of or in addition to the geometric and/or photometric criteria. In at least some embodiments, the patch matching technique may leverage and extend the patch matching technology as described in Barnes, et al. (2009) and Barnes, et al. (2010), and in the section titled *Determining Correspondence Between Image Regions*.

As indicated at 912, the method may then calculate vertical and horizontal gradients for the matched patch. As indicated at 914, the patch region in the reconstructed image may then be filled according to a voting technique to blend the matched patch with the target patch of target image. In at least some embodiments, this voting may be performed according to each of the color channels (e.g., the R, G, and B channels in RGB color space, or the L, a, and b channels in L*a*b* color space) and the two gradient channels so that the patch is blended with the image according to both the color and gradient domains.

At 916, if there are more pixels to be processed, then the method returns to element 906. Otherwise, the method outputs the reconstructed image, as indicated at 918.

Figure 30:
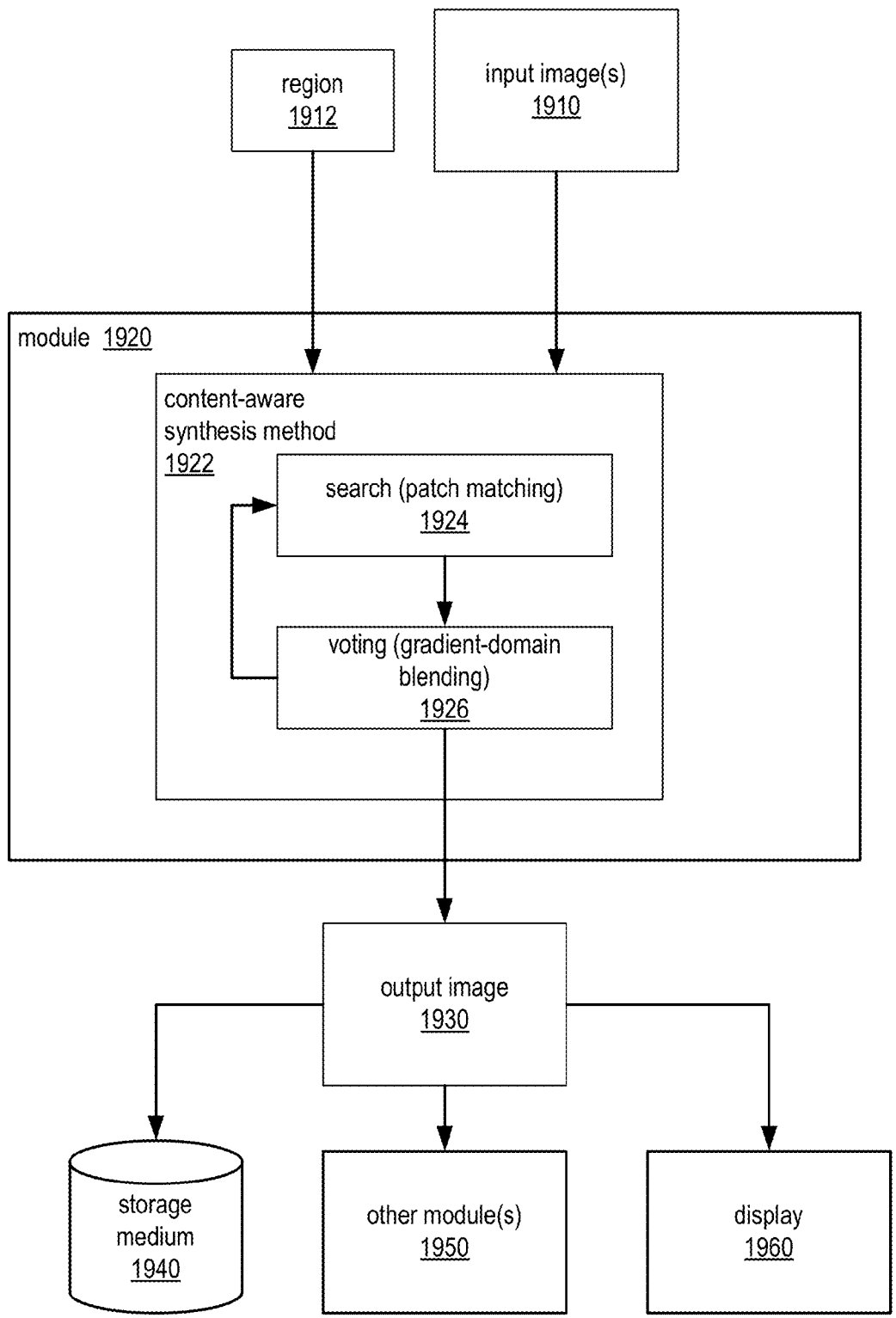
FIG. 30 illustrates an example module that may implement embodiments of the image processing techniques as described herein.
Figure 31:
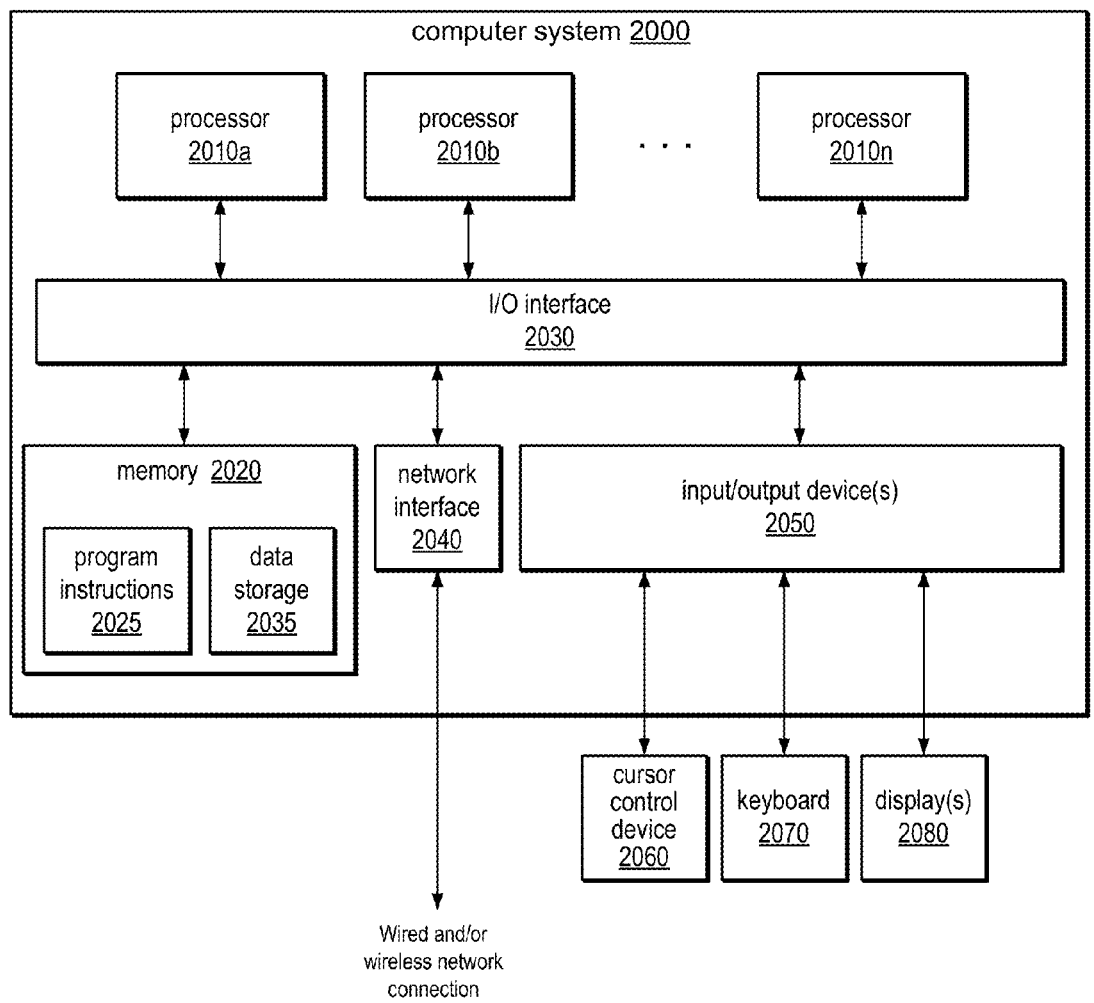
FIG. 31 illustrates an example computer system that may be used in embodiments.

Embodiments of the algorithms, methods, and techniques as illustrated and described herein, for example in FIGS. 26 through 28 and in Algorithm 1, may be implemented, for example, as or in a module or modules, for example a module as illustrated in FIG. 30. FIG. 31 shows an example computer system on which embodiments may be implemented.

Generalized Patch-Based Synthesis Details

This section discusses aspects of the patch-based synthesis algorithms, methods, and techniques as illustrated and described in FIGS. 26 through 28 and in Algorithm 1 in more detail, using single source image synthesis as an example. Note that the techniques discussed in this section may be extended to apply to multi-source image synthesis, image morphing, multi-image blending, and other applications.

Figure 29E:
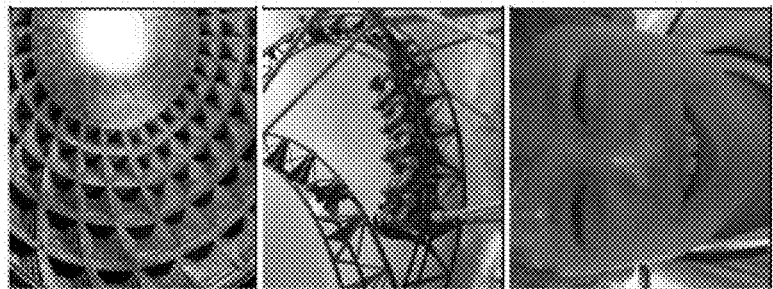
FIGS. 29A through 29E illustrate image completion according to at least some embodiments, and compare results to conventional techniques.
Figure 29D:
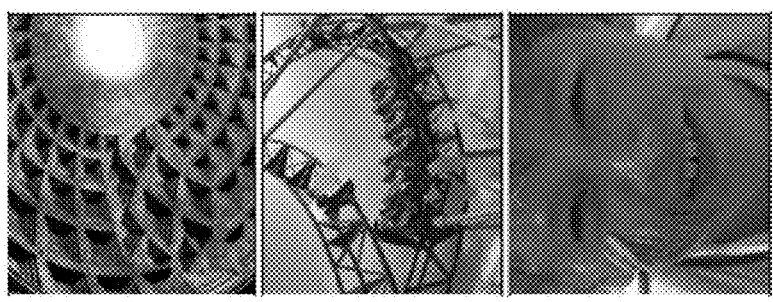
Figure 29C:
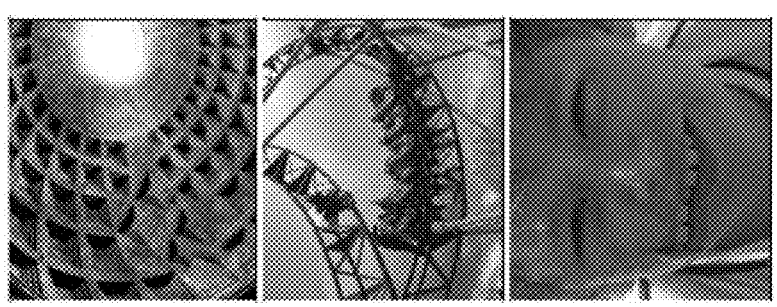
Figure 29B:
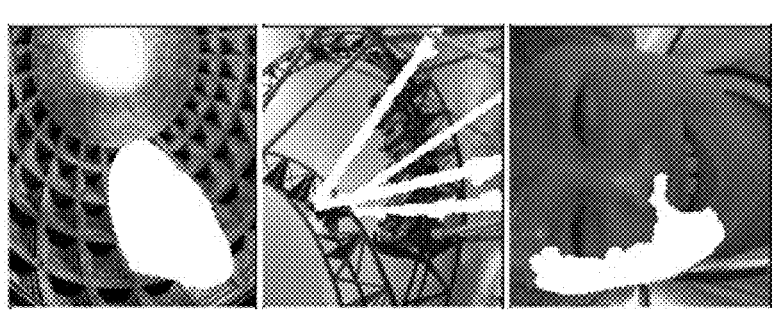
Figure 29A:
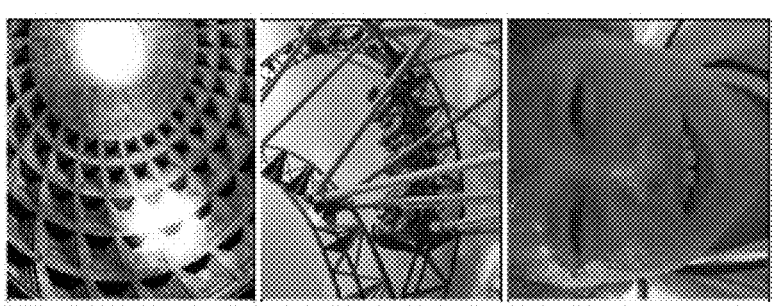

Single source image synthesis, or image completion, is a relatively simple application of the content-aware, patch-based image synthesis techniques described herein. FIGS. 29A through 29E illustrate image completion according to at least some embodiments, and compare results to conventional techniques. FIG. 29A shows three sample input images. FIG. 29B shows regions or "holes" to be replaced, indicated by the white regions. FIGS. 29C and 29D show results of conventional techniques for comparison with FIG. 29E. FIG. 29E shows results generated by an embodiment of the single source image synthesis technique described herein. FIG. 29E illustrates that embodiments can successfully fill large holes using a richer search space than used by conventional techniques. Embodiments can exploit rotational and reflection symmetry and complete edges and textures using examples from different orientations, scales and colors.

For the special case of image completion, input may include a user-defined mask dividing the image into source region S and target region T (the region of all patches overlapping the "hole" to be filled). See, e.g., FIG. 29B, where the white regions in the three images illustrate the target region T and everything outside the region T may be included in the source region S. The objective is to replace the contents of region T using contents from region S. The regions of the input image may be inconsistent due to spatially varying illumination or geometric transformations as can be seen in FIG. 29A. The task may be posed as a patch-based optimization problem with an energy function. In at least some embodiments, the following energy function may be used:

$$E(T, S) = \sum_{q \subset T} \min_{p \subset S}(D(Q, P) + \lambda D(\nabla Q, \nabla P)), \quad (1)$$

where $Q = N(q)$ is a w×w patch with target pixel q at its upper left corner, and $P = f(N(p))$ is a w×w patch that is a result of a geometric and photometric transformation $f$ applied on a small neighborhood N around source pixel p. Note that other formulations of an energy function may be used in some embodiments.

In at least some embodiments, all patches have five channels: three color channels and two gradient channels of the luminance at each pixel. In at least some embodiments, in L*a*b* color space may be used, although other color spaces (e.g., RGB) may be used in some embodiments. In the L*a*b* color space, the five channels may be denoted as (L, a, b, $\nabla_x L$, $\nabla_y L$). However, to simplify the notation, P (or Q) may be used to denote only the three color channels of the patch, and $\nabla P$ (or $\nabla Q$) may be used to denote the two luminance gradient channels. The transformations f encompass translation, rotation, non-uniform scale and reflection, as well as gain and bias in each channel. In at least some embodiments, these transformations may be limited to predefined ranges that can vary depending on the task or on prior information (e.g., small expected geometric variations). D is the sum of squared distances (SSD) over all channels, and the gradient dimensions may be weighted by $\lambda$ with regard to the color channels. This energy function defines the optimal fill in which every local neighborhood appears most similar to some local neighborhood within the source, under a restricted set of transformations.

This energy function searches over local geometric and appearance (photometric) transformations of the patches in the source, as opposed to only shifted patches as is done in conventional techniques. This extension is important, for example, in the case of multiple sources that contain larger variations in geometry and color. This energy function also includes patch gradients in the distance metric in addition to colors. This may improve robustness to large-scale illumination and structure variations. Note that adding gradients not only boosts the high frequencies of local descriptors, but also affects the step that updates the colors, as described below.

In at least some embodiments, an iterative algorithm may be used to optimize such an objective function by alternating in every scale between two steps—patch search and color voting, where each step is guaranteed to decrease the energy function. In the search step, similar (nearest neighbor) input patches are retrieved for all overlapping patches in the output. These patches are then blended together in the voting step by averaging the color "votes" that each such patch casts on every output pixel, resulting in a new output image. The iterations continue until the colors converge, and are repeated across scales in a coarse-to-fine fashion. Embodiments of the patch-based synthesis techniques may modify this iterative algorithm in the search and voting steps to guarantee that each reduces the energy function, for example as given in Equation 1, as described below.

In the search step, to find the closest patch P in the energy function (e.g., equation 1), embodiments may employ the generalized patch matching technique as described herein. The patch matching technique efficiently finds dense approximate nearest neighbor source patches for all target image patches, with a search space of three degrees of freedom: translations, rotations and scales. The search space may be further extended to handle reflections and non-uniform scale in the geometric domain, as well as gain and bias in the photometric domain, as these transformations occur often in natural images, as can be seen in FIG. 29A.

In at least some embodiments, to obtain invariance to illumination, exposure, and color changes, gain g and bias b adjustments may be applied in each channel of a source patch to best match the target patch (in the $L_2$ sense). In at least some embodiments, these adjustments may be limited within some reasonable predefined ranges. In at least some embodiments, the adjustments may be computed as follows, where c is the color channel:

$$g(P^c) = \min\{\max\{\sigma(Q^c)/\sigma(P^c), g_{min}\}, g_{max}\},$$

$$b(P^c) = \min\{\max\{\mu(Q^c) - g(P^c)\mu(P^c), b_{min}\}, b_{max}\},$$

where $c \in (L,a,b)$, $\sigma()$ and $\mu()$ are the standard deviation and mean of the input patch at each channel c, and $[g_{min}, g_{max}]$ and $[b_{min}, b_{max}]$ are the gain and bias ranges. The gain and bias are used to adjust the colors of the source patch:

$$P^c: P_c \leftarrow g(P^c)P^c + b(P^c).$$

In the voting step, note that the energy function given as equation 1 is quadratic in all patch terms, where every target pixel participates in w×w terms—one for each overlapping patch. Therefore, an optimal target image satisfies:

$$T = \underset{I}{\operatorname{argmin}}\{D(I, \overline{T}) + \lambda D(\nabla I, \overline{\nabla T})\}, \quad (2)$$

where $\overline{T}$ and $\overline{\nabla T}$ are images with the same size as I and their values at pixel (i, j) correspond to:

$$\overline{T}(i, j) = \sum_{\substack{k=0 \ldots w-1 \\ l=0 \ldots w-1}} \frac{NN(Q_{i-k, j-l})(k, l)}{w^2}, \quad (3)$$

$$\overline{\nabla T}(i, j) = \sum_{\substack{k=0 \ldots w-1 \\ l=0 \ldots w-1}} \frac{\nabla NN(Q_{i-k, j-l})(k, l)}{w^2}.$$

$NN(Q_{i,j})$ is the nearest neighbor patch in source S (referred to as a source patch) to the target patch $Q_{i,j}$ (assuming that the top left of the patch is its coordinate), and $NN(Q_{i,j})(k, l)$ selects the pixel (k, l) within that source patch (after transformation). That is, $\overline{T}$ collects the average colors of the overlapping transformed source patches. The gradient channel $\overline{\nabla T}$ is assigned in the same manner. In at least some embodiments, equation 2 may be used as the discrete screened Poisson equation applied to the color and gradient channels computed using the voting technique. (See, e.g., element 810 of FIG. 27).

In at least some embodiments, the search and voting steps may be iterated until convergence. In at least some embodiments, the iterations may be stopped after 10-30 iterations. It at least some embodiments, more iterations may be performed at coarse scales and fewer at finer scales. In at least some embodiments, the process is repeated at multiple scales in a coarse-to-fine manner, using a Gaussian pyramid and initializing with colors interpolated from the hole boundaries with inverse distance weighting.

Generalized Patch-Based Synthesis Examples

FIGS. 6A through 25D graphically illustrate various aspects of the patch matching techniques, the patch-based synthesis techniques, and content-aware synthesis methods such as a content-aware fill method, according to at least some embodiments. In addition, some of these Figures compare results of conventional techniques to results of the patch-based synthesis techniques as described herein.

FIGS. 6A-6B, 7A-7B, 8A-8B, 9A-9B, and 10A-10B illustrate some example failure cases for conventional patch-based fill methods. In each of these cases, the image on the left (FIGS. 6A, 7A, 8A, 9A, and 10A) shows an input image and indicates a region to be filled (e.g., the region inside the white rectangle in FIG. 6A). The image on the right (FIGS. 6B, 7B, 8B, 9B, and 10B) shows results (e.g., the region inside the white dashed rectangle in FIG. 6B) of a conventional fill method that only employs translation and that does not implement the geometric transformations, photometric transformations, and gradient features as implemented in embodiments of the content-aware synthesis methods described herein.

Figure 9A:
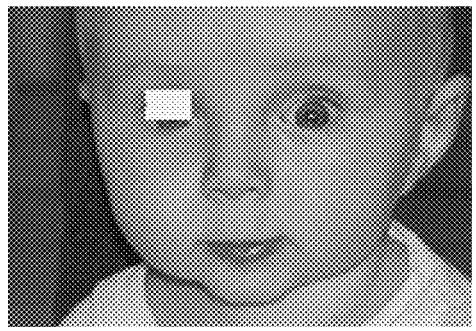
Figure 9B:
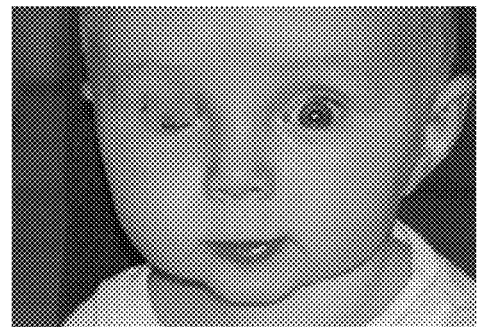

FIGS. 6A and 6B illustrate a case that shows edge misalignment in the filled region in FIG. 6B. This edge misalignment may result from the perspective; the conventional fill method used in this example fails in connecting the lines across the fill region. FIGS. 7A and 7B illustrate that completing the orange shown in FIG. 7A using the conventional fill method fails to produce satisfactory results by translating the patches, even with constraints. FIGS. 8A and 8B illustrate that completing a human face as shown in FIG. 8A using the conventional fill method fails to produce satisfactory results. FIGS. 9A and 9B illustrate that completing the right eye of the human face as shown in FIG. 9A using the conventional fill method fails to produce satisfactory results.

Figure 10A:
Figure 10B:

In FIG. 10A, the missing region is in a boundary of darker and brighter regions. The conventional fill method tries to synthesize the missing region by putting a step-like change in the middle, as shown in FIG. 10B. The conventional fill method does not consider gradient or edge features in its attempt to synthesize the missing region. While in some cases this might produce acceptable (if not correct) results, in other cases the results may be unacceptable.

FIGS. 11A through 16 illustrate geometric transformations included in the patch-based synthesis techniques, according to at least some embodiments.

Figure 11A:
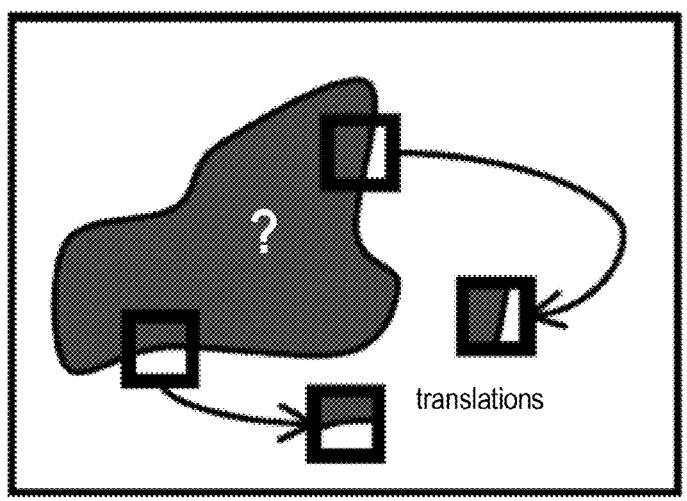
FIGS. 11A through 11E compare conventional fill methods that incorporate only translation to embodiments that incorporate geometric transformations such as rotation and scale.
Figure 11B:
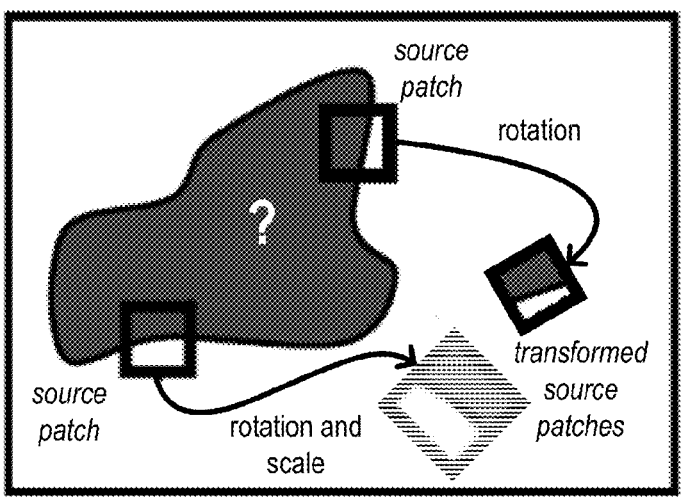
Figure 11C:
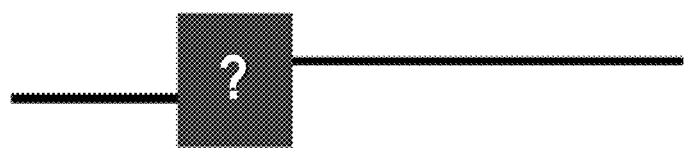
Figure 11D:
Figure 11E:

FIGS. 11A through 11E compare conventional fill methods that incorporate only translation (FIG. 11A) to embodiments that incorporate geometric transformations such as rotation and scale (FIG. 11B) to generate transformed source patches. As illustrated in FIG. 11B, embodiments may apply rotation and/or scale geometric transformations on the source patches both for search and synthesis, to generate transformed source patches. FIGS. 11C through 11E illustrate aligning edges, according to at least some embodiments. FIG. 11C illustrates two edges that need to be aligned. The misaligned edges are hard to handle in conventional fill methods that perform only translation. Generally, by only applying translation to lines to fill the hole, the intersection will tend to be blurry and/or jaggy (FIG. 11D; also see, e.g., FIG. 6B). As shown in FIG. 11E, by applying rotation to the patches, the lines can be more easily and cleanly connected (also see, e.g., FIG. 14). By rotating and scaling the source patches, the number of source patches that can be used in synthesis is increased, and therefore repetition, an undesirable artifact in many cases where fewer patches are available, may be reduced. In addition, applying rotation and scale geometric transformations to source patches during synthesis may make it harder for the user to perceive repetition when compared to patches that are only translated.

Figure 12:
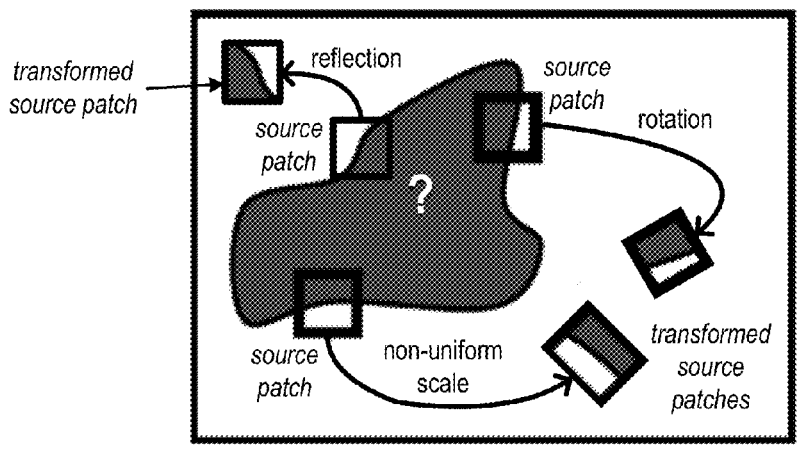
FIG. 12 illustrates that embodiments may apply reflection and non-uniform scale geometric transformations.

FIG. 12 illustrates that embodiments may also apply reflection and non-uniform scale geometric transformations to generate transformed source patches. A non-uniform scale transformation scales the source patch by different factors in one direction than in another, or scales the source patch in one direction but not another, for example. Reflection may, for example, enable embodiments to improve the quality of synthesis when there is a symmetrical relationship between the source image or region and the target image or region. An example of a symmetrical relationship are the eyes on a face, for example as shown in FIGS. 9A and 9B. As can be seen in FIG. 9B, conventional fill methods that do not address reflection produce very poor results. By applying reflection when searching for source patches and using the transformed source patches in synthesis, results of synthesizing the missing portion of the right eye in FIG. 9A may be improved over the results of conventional fill methods that do not employ reflection, as can be seen by comparing FIG. 18B to FIG. 9B.

Figure 13:
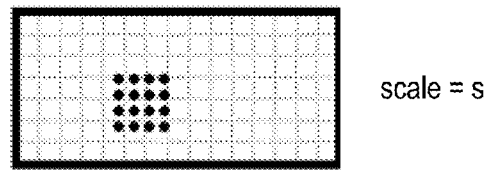
FIG. 13 illustrates methods for retrieving high quality patches, according to at least some embodiments.
Figure 13:
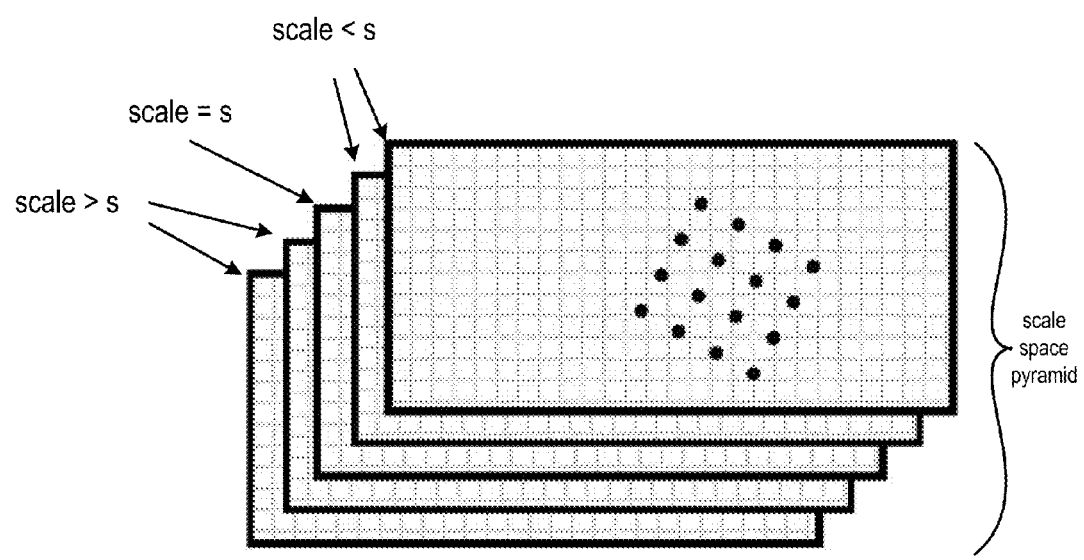

FIG. 13 illustrates methods for retrieving high quality transformed source patches, according to at least some embodiments. Applying the geometric transformations to the source patches during synthesis may result in the need to apply interpolation for subpixel coordinates. Since at least some embodiments solve $L_2$ minimization, it is possible to get stuck at a potentially blurry local minimum. Therefore, to generate higher quality transformed source patches, at least some embodiments may employ a high-resolution scale space pyramid (generated for each source image) and a high-order filtering technique, for example Lancsoz3 filtering, for interpolation.

Figure 14:
FIGS. 14, 15, and 16 show results generated using embodiments that employ geometric transformations when synthesizing the missing regions shown in FIGS. 7A, 8A, and 9A, respectively.
Figure 15:
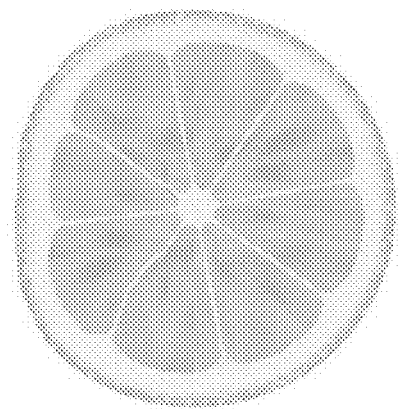
Figure 16:

FIGS. 14, 15, and 16 show results generated using embodiments that employ the geometric transformations as described above when synthesizing the missing regions shown in FIGS. 6A, 7A, and 8A, respectively. These results can be compared to the results of a conventional fill technique that employs only translation, as shown in FIGS. 6B, 7B, and 8B, respectively.

FIG. 14 shows results generated using embodiments that employ the geometric transformations when synthesizing the missing region shown in FIG. 6A. FIG. 14 can be compared to FIG. 6B, which shows edge misalignment due to perspective and the conventional fill technique's difficulty in connecting lines across the fill region. As can be seen in FIG. 14, the results of embodiments that employ the geometric transformations are improved over the results in FIG. 6B. By applying rotation and scale geometric transformations to source patches, embodiments can warp the image to connect the lines. At least some embodiments may include line constraints to further improve the quality.

FIG. 15 shows results generated using embodiments that employ the geometric transformations when synthesizing the missing region shown in FIG. 7A. FIG. 15 can be compared to FIG. 7B. As can be seen in FIG. 15, the missing region of the orange can be synthesized without user interaction.

FIG. 16 shows results generated using embodiments that employ the geometric transformations when synthesizing the missing region of the human figure shown in FIG. 8A. FIG. 16 can be compared to FIG. 8B. As can be seen in FIG. 16, by employing reflection and thus taking advantage of symmetry present in many objects such as human faces or figures, an object that exhibits symmetry can be more accurately completed using embodiments.

As noted above, FIGS. 11A through 16 illustrate geometric transformations. In addition to applying the geometric transformations to patches, at least some embodiments may also use photometric properties of patches, for example gain and bias properties, in both searching for patches and patch adjustment during synthesis. At least some embodiments may search for patches according to photometric properties (e.g., gain and bias) in all color channels. The following is an example formulation for applying gain (g) and bias (b) in patch adjustment. D is a patch distance function. T is the target, and S is the source:

$$\{\hat{g}, \hat{b}\} = \underset{g,b}{\mathrm{argmin}} D(T, g \times (S + b))$$

s.t.

$$g_{min} < g < g_{max}$$

$$b_{min} < b < b_{max}$$

$$S_{new} = \hat{g} \times (S + \hat{b})$$

FIGS. 17A and 17B illustrate applying gradients in the patch-based synthesis process, according to at least some embodiments. At least some embodiments may incorporate distance d between gradients of source (Q) and target (P) patches:

$$d = \Sigma_{P \subset T} \min_{Q \subset S}(\|P - f(Q)\|)$$

into the optimization energy, as shown in FIG. 17A. The color and gradient vote may be formulated as:

$$T = \frac{1}{N} \sum_{j=1}^{N} f(Q)$$

In at least some embodiments, as shown in FIG. 17B, when solving this least square equation, an optimal solution for the energy function that may be used is to do voting both for colors and gradients and then solve the Poisson equation with the voted values and color constraints in the boundary. Distance d becomes:

$$d = \Sigma_{P \subset T} \min_{Q \subset S}(\|P - f(Q)\| + \lambda \|\nabla P - \nabla f(Q)\|)$$

s.t.

$$T(q \subset \Omega) = S(p \subset \Omega)$$

The color and gradient vote may be formulated as:

$$T = \frac{1}{N} \sum_{j=1}^{N} f(Q)$$

$$\nabla T = \frac{\sum_{j=1}^{N} \nabla f(Q)}{N}$$

Figure 18A:
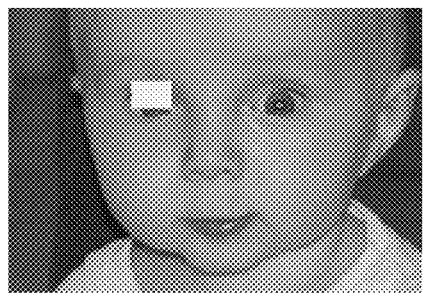
FIGS. 18A and 18B show results generated using embodiments that employ the geometric transformations (specifically, reflection) and photometric transformations when synthesizing a missing region.
Figure 18B:

FIGS. 18A and 18B show results generated using embodiments that employ the geometric transformations (in this case, specifically reflection) and photometric transformations when synthesizing the missing region of the right eye as shown in FIG. 18A (FIG. 18A is the same as FIG. 9A). FIG. 18B can be compared to FIG. 9B. As can be seen in FIG. 18B, embodiments may take advantage of symmetry between the eyes to fill the right eye from the left eye, and photometric transformations may also be used to also adjust the color and other visual aspects to produce a more natural look.

Figure 19A:
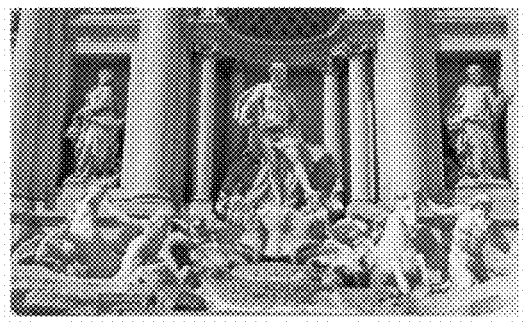
FIG. 19A through 19D show an example of using one source image to fill a region in a second image, according to at least some embodiments.
Figure 19B:
Figure 19C:
Figure 19D:

FIG. 19A through 19D show an example of using one source image to fill a region in a second image, according to at least some embodiments. The region shown by the white box in FIG. 19B is to be filled from the image shown in FIG. 19A. This is a relatively complex example as the lighting and view angles of the two images shown in FIGS. 19A and 19B are different. FIGS. 19C and 19D show results from a conventional patch-based fill method and results from an embodiment that employs geometric transformations and photometric transformations, respectively, with the filled region indicated by the white dashed box. As can be seen by comparing FIGS. 19C and 19D, embodiments may more successfully recover missing regions in more complex cases such as this example than can conventional methods.

Figure 20A:
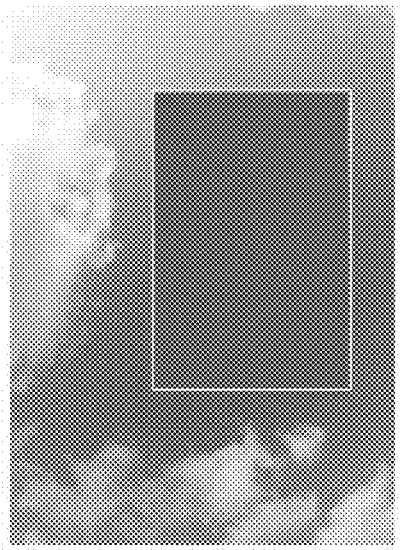
FIGS. 20A through 20C show an example that illustrates using gradients, according to at least some embodiments.
Figure 20B:
Figure 20C:
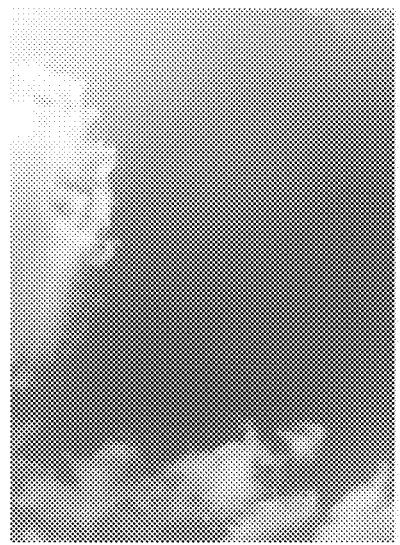

FIGS. 20A through 20C show an example that illustrates using gradients, according to at least some embodiments. FIG. 20A shows an image of the sky, with a region to be filled indicated by the white box. FIG. 20B shows results generated by a patch-based fill method that does not incorporate gradients. FIG. 20C shows results generated by an embodiment that incorporates gradients. By including gradients, the missing portion of the sky can be more successfully synthesized by interpolating gradients of neighbor patches.

Figure 21A:
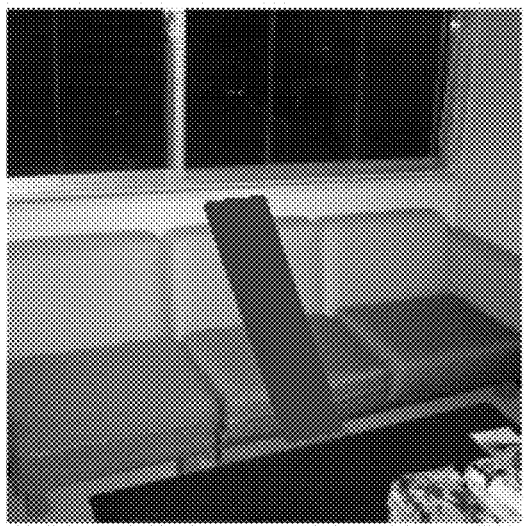
FIGS. 21A through 21D show an example that illustrates using gradients, according to at least some embodiments.
Figure 21B:
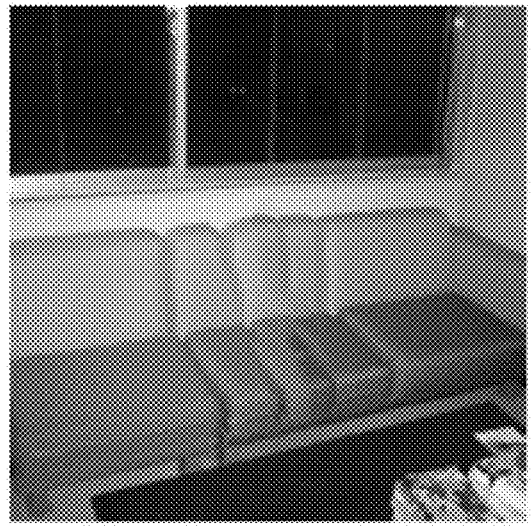
Figure 21C:
Figure 21D:

FIGS. 21A through 21D show another example that illustrates using gradients, according to at least some embodiments. In FIG. 21A, the missing region is in a boundary of darker and brighter regions. The conventional fill method tries to synthesize the missing region by putting a step-like change in the middle, as shown in FIG. 21B. Embodiments of the patch-based synthesis method without gradients produce better results, as shown in FIG. 21C. However, adding gradients causes the method to follow the gradients of the rest of the image, producing the image shown in FIG. 21D.

FIGS. 22A through 25D illustrate several example applications of the patch-based synthesis methods described herein. These applications may include, but are not limited to, multi-image hole filling, object cloning, and image stitching (e.g., panorama creation).

In multi-image hole filling, embodiments may be applied to, for example, fill a hole in an image when an object, for example a person, needs to be removed from the image using one or more other images as a source for the background to be filled in. The colors, angles and scales may be different in the images, which would make it difficult if not impossible for conventional hole-filling methods to successfully fill the region. Using embodiments, the rotation, scale, and color misalignments may be fixed to more successfully recover and fill with the background content from the source image(s) to synthesize content for the hole in the target image.

Figure 22A:
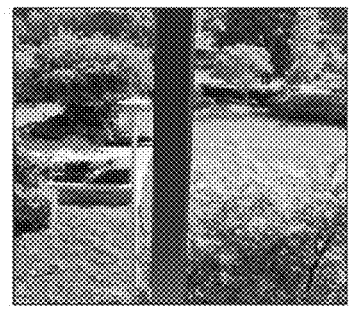
FIGS. 22A through 22F show an example of multi-image hole filling, according to at least some embodiments.
Figure 22B:
Figure 22C:
Figure 22D:
Figure 22E:
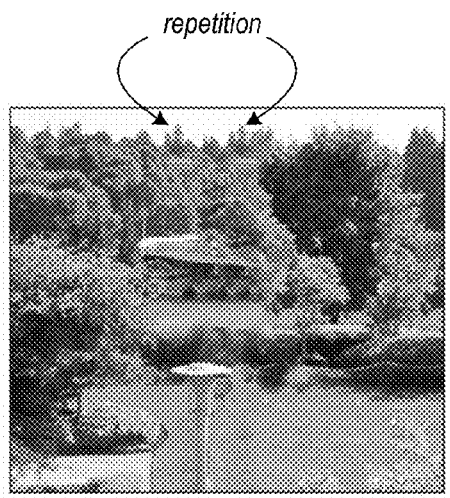
Figure 22F:
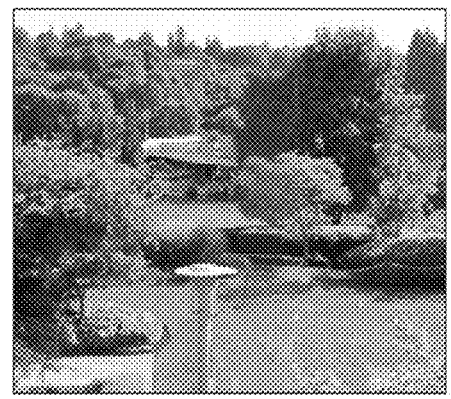

FIGS. 22A through 22F show an example of multi-image hole filling, according to at least some embodiments. When there is an occlusion in front of a scene as in this case, the user can move around and capture different views and thus parts of the scene at each of multiple shots. FIGS. 22A through 22C show three source images of a scene taken from different angles. Note that the window frame partially occludes all three images. FIG. 22D shows the target image (similar to the image in FIG. 22C), with the region to be filled indicated by the gray rectangle. FIG. 22E shows results generated using a conventional patch-based fill technique that does not incorporate rotation, scale, and color alignment. FIG. 22F shows results generated using an embodiment of the patch-based synthesis method that may obtain patches from the images (e.g. from FIGS. 22A and 22B) using geometric and photometric transformations when searching for patches, and that may correct for rotation, scale, and color misalignments. Note that repetition, visible for example in the treetops of FIG. 22E, is much less noticeable in FIG. 22F.

FIGS. 23A through 23G show an example of multi-image hole filling, according to at least some embodiments. FIGS. 23A and 23B illustrate two source images of a scene. However, the user may wish to remove the person's head from FIG. 23B and fill the region with content from FIG. 23A. FIG. 23C shows a zoom-in to FIG. 23B that shows a masked region to be filled in. FIG. 23D shows results of a conventional patch-based fill method that does not employ the geometric and photometric transformations as described herein. FIG. 23E shows results of a conventional homography, warp plus blend technique for combining the images. FIG. 23F shows results generated using an embodiment of the patch-based synthesis method that may obtain patches from image 23A using geometric and photometric transformations when searching for patches, and that may correct for rotation, scale, and color misalignments. FIG. 23G shows a zoom-in to the region in FIG. 23A that is occluded in FIG. 23B for comparison to the results of these methods. Note that the image in FIG. 23F is much more true to the original than the image in FIG. 23D, and does not show misalignment artifacts such as edges and color changes as does the image in FIG. 23E.

Figure 24A:
FIG. 24A through 24C show an example of cloning, according to at least some embodiments.
Figure 24B:
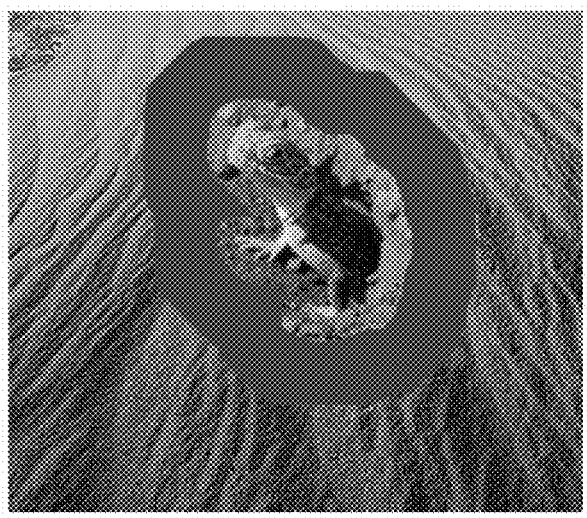
Figure 24C:
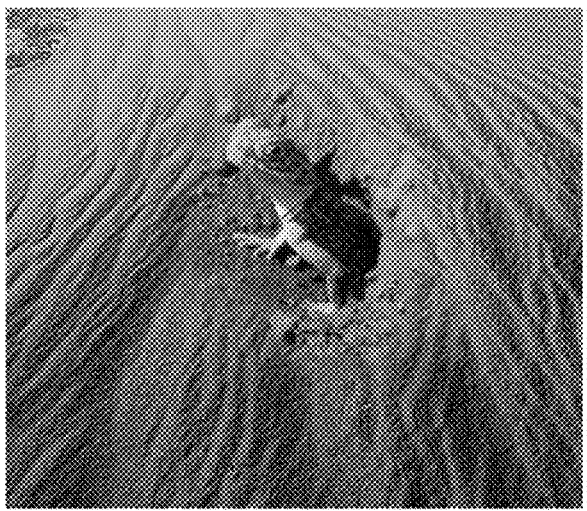

FIG. 24A through 24C show an example of cloning, according to at least some embodiments. FIG. 24A shows an original image; the background shows a desert environment; the lizard and region around the image has been copied in from another image. The object is to add the lizard to the background desert, but due to texture differences the boundaries can be clearly seen. FIG. 24B shows a mask around the lizard. The masked region was re-synthesized based on the two source images using an embodiment of the patch-based synthesis methods described herein to achieve the output image shown in FIG. 24C. As can be seen, the method provides a more seamless cut, provides some smooth light adjustment as can be seen on the sand regions, and performs some feathering and warping. At some regions, where possible, the method generates a smooth transition from stone to sand.

Figure 25A:
FIGS. 25A through 25D show an example of image stitching, according to at least some embodiments.
Figure 25B:
Figure 25C:
Figure 25D:

FIGS. 25A through 25D show an example of image stitching, according to at least some embodiments. FIGS. 25A and 25B show two images of a scene take from different angles and with different lighting. The object is to combine the two images. Conventional methods for combining the two images would generally result in quite visible edges and seams. FIG. 25C shows a mask on FIG. 25A that indicates a region to be filled from FIG. 25B. FIG. 25D shows a resulting output image that provides a seamless transition between the regions of the image.

Additional applications of the patch-based synthesis methods to those described above may include, but are not limited to, morphing, summarizing videos, and face fusion.

At least some embodiments may apply constraints on one or more of the geometric transformations, photometric transformations, and/or gradients. At least some embodiments may include additional geometric operations than the ones described herein, for example an affine transform. At least some embodiments may include additional photometric operations than the ones described herein, for example a Laplacian operation.

Embodiments have been described herein primarily in the context of performing fill or other synthesis operations on similar images. However, it is to be noted that embodiments may be applied to perform synthesis operations using two or more dissimilar or completely different images.

Example Implementations

Embodiments of the techniques described herein, including the patch matching techniques, patch-based synthesis techniques, and content-aware synthesis methods may be used in any image editing or image processing application. Examples of applications in which embodiments may be used include, but are not limited to, Adobe® Photoshop®.

"Adobe" and "Photoshop" are either registered trademarks or trademarks of Adobe Systems Incorporated in the United States and/or other countries. An example module that may implement the patch matching techniques, patch-based synthesis techniques, and content-aware synthesis methods is illustrated in FIG. 30. An example system on which such a module may be implemented is illustrated in FIG. 31.

Some embodiments may include a means for image editing using the techniques, including the patch matching techniques, patch-based synthesis techniques, and content-aware synthesis methods as described herein. For example, a module may be provided that may implement an embodiment of a content-aware synthesis method, for example as described in Algorithm 1 and/or as described in reference to FIGS. 26, 27, and 28. The module may, for example, receive one or more images and an indication of a region in one of the images to be filled as input, and apply a content-aware synthesis method as described herein to fill the region from one or more of the input images. The module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform a content-aware synthesis method as described herein, for example as described in Algorithm 1 and/or as described in reference to FIGS. 26, 27, and 28. Other embodiments of the module may be at least partially implemented by hardware circuitry and/or firmware stored, for example, in a non-volatile memory.

FIG. 30 illustrates an example module that may implement embodiments of the image processing techniques as described herein, including the patch matching techniques, patch-based synthesis techniques, and a content-aware synthesis method such as a hole-filling method that leverages the patch matching and patch-based synthesis techniques. Module 1920 receives as input one or more images 1910 and, in some implementations, an indication of a region 1912 to be filled in one of the images (a target image). The module 1920 may, for example, implement a content-aware synthesis method 1922 that iteratively performs a search 1924 using a patch matching technique as described herein to search for patches to be used in filling an indicated region 1912 in a target image, and a voting 1926 technique that implements gradient-domain blending to fill the region in the target image using the located patches. As noted above, geometric transformations, photometric transformations, and gradients may be applied at both the search stage and the voting (blending) stage. The module 1920 may generate as output an output image 1930 with the indicated region 1912 filled using patches from the one or more images that may have been adjusted according to geometric and/or photometric features, for example to account for rotation, scale, color, texture, and/or lighting differences, when blending with the target image. Output image 1930 may, for example, be stored to a storage medium 1940, such as system memory, a disk drive, DVD, CD, etc., displayed on a display 1960, and/or passed to one or more other modules 1950 for further image processing. FIG. 31 illustrates an example computer system on which embodiments of module 1920 may be implemented. Note that a module 1920 may be implemented that leverages the patch matching and patch-based synthesis techniques as described herein to perform other content-aware synthesis tasks such as cloning, morphing, and image stitching.

Example System

Embodiments of the various image processing techniques as described herein, including the patch matching techniques, patch-based synthesis techniques, and content-aware synthesis methods, may be executed on one or more computer systems, which may interact with various other devices. One such computer system is illustrated by FIG. 31. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the various image processing techniques as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor(s) 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor(s) 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor(s) 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 31, memory 2020 may include program instructions 2025, configured to implement embodiments of the various image processing techniques as described herein, and data storage 2035, comprising various data accessible by program instructions 2025. In one embodiment, program instructions 2025 may include software elements of embodiments of the various image processing techniques as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the various image processing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
  synthesizing, by one or more computing devices, a region in a target image from image data obtained from one or more source images, said synthesizing comprises:
    identifying transformed source patches in the one or more source images that best match target patches in the target image, said identifying comprises:
      for each target patch, applying one or more transformations from a set of supported transformations to each of a plurality of candidate source patches in the one or more source images, the set of supported transformations including one or more geometric or photometric transformations; and
      comparing each transformed source patch to the respective target patch to identify a transformed source patch that best matches the respective target patch; and
    blending image data, using color gradient domain blending techniques, according to each identified geometrically or photometrically transformed source patch from the one or more source images into the target image.

2. The method as recited in claim 1, wherein the one or more geometric transformations include one or more of a reflection transformation or a non-uniform scale transformation.

3. The method as recited in claim 2, wherein the one or more geometric transformations further include one or more of a uniform scale transformation, a translation transformation, or a rotation transformation.

4. The method as recited in claim 1, wherein the one or more photometric transformations include one or more of a gain transformation to adjust for brightness differences between the one or more source images and the target image or a bias transformation to adjust for contrast differences between the one or more source images and the target image.

5. The method as recited m claim 1, wherein the set of supported transformations includes one or more geometric transformations and one or more photometric transformations.

6. The method as recited in claim 1, further comprising iteratively performing said identifying and said blending.

7. The method as recited in claim 1, further comprising iteratively performing said identifying and said blending at each of a plurality of scales from a coarsest scale to a finest scale.

8. The method as recited in claim 1, wherein said identifying further comprises comparing gradient values determined at each transformed source patch to gradient values at the respective target patch in the target image.

9. The method as recited in claim 1, wherein said color gradient domain blending techniques comprises a voting technique that averages color and gradient values from the identified transformed source patches, the method further comprising applying a screened Poisson technique to the averaged color and gradient values to integrate the averaged color and gradient values into the target image.

10. The method as recited in claim 1, wherein the one or more source images include the target image, and wherein the plurality of candidate source patches include patches in the target image that are located outside the region being synthesized.

11. The method as recited in claim 1, wherein there are two or more source images, wherein the plurality of candidate source patches includes patches in each of the two or more source images, and wherein at least one transformed source patch is identified in each of at least two of the two or more source images.

12. A system, comprising:
  at least one processor; and
  a memory comprising program instructions, the program instructions executable by the at least one processor to synthesize a region in a target image from image data obtained from one or more source images, to synthesize the region, the program instructions executable by the at least one processor to implement operations comprising:
    identifying transformed source patches in the one or more source images that best match target patches in the target image, to identify a source patch that best matches a particular target patch, the program instructions executable by the at least one processor to implement operations comprising:
      applying one or more transformations from a set of supported transformations to each of a plurality of candidate source patches in the one or more source images, the set of supported transformations including one or more geometric or photometric transformations; and
      comparing each transformed source patch to the particular target patch to identify a transformed source patch that best matches the respective target patch; and
    blending image data, using color gradient domain blending techniques, according to each identified geometrically or photometrically transformed source patch from the one or more source images into the target image.

13. The system as recited in claim 12, wherein the one or more geometric transformations include one or more of a reflection transformation or a non-uniform scale transformation.

14. The system as recited in claim 12, wherein the one or more photometric transformations include one or more of a gain transformation to adjust for brightness differences between the one or more source images and the target image or a bias transformation to adjust for contrast differences between the one or more source images and the target image.

15. The system as recited in claim 12, wherein the program instructions are executable by the at least one processor to iteratively perform said identifying and said blending at each of a plurality of scales from a coarsest scale to a finest scale.

16. The system as recited in claim 12, wherein, to identify the source patches, the program instructions are further executable by the at least one processor to compare gradient values determined at each transformed source patch to gradient values at the respective target patch in the target image.

17. The system as recited in claim 12, wherein, the color gradient domain blending techniques comprise a voting technique that averages color and gradient values from the identified transformed source patches, and wherein the program instructions are further executable by the at least one processor to apply a screened Poisson technique to the averaged color and gradient values to integrate the color and gradient values into the target image.

18. The system as recited in claim 12, wherein there are two or more source images, wherein the plurality of candidate source patches includes patches in each of the two or more source images, and wherein at least one transformed source patch is identified in each of at least two of the two or more source images.

19. A non-transitory computer-readable storage medium storing program instructions, the program instructions computer-executable to implement operations comprising:
   synthesizing a region in a target image from image data obtained from one or more source images, in said synthesizing, the program instructions computer-executable to implement operations comprising:
      identifying transformed source patches in the one or more source images that best match target patches in the target image, in said identifying, the program instructions computer-executable to implement operations comprising:
         for each target patch, applying one or more transformations from a set of supported transformations to each of a plurality of candidate source patches in the one or more source images, the set of supported transformations including one or more geometric or photometric transformations; and
         comparing each transformed source patch to the respective target patch to identify a transformed source patch that best matches the respective target patch; and
      blending image data, using color gradient domain blending techniques, according to each identified geometrically or photometrically transformed source patch from the one or more source images into the target image.

20. The non-transitory computer-readable storage medium as recited in claim 19, wherein the one or more geometric transformations include one or more of a reflection transformation or a non-uniform scale transformation.

21. The non-transitory computer-readable storage medium as recited in claim 19, wherein the one or more photometric transformations include one or more of a gain transformation to adjust for brightness differences between the one or more source images and the target image or a bias transformation to adjust for contrast differences between the one or more source images and the target image.

22. The non-transitory computer-readable storage medium as recited in claim 19, wherein the program instructions are computer-executable to implement iteratively performing said identifying and said blending at each of a plurality of scales from a coarsest scale to a finest scale.

23. The non-transitory computer-readable storage medium as recited in claim 19, wherein, in said identifying, the program instructions are further computer-executable to implement comparing gradient values determined at each transformed source patch to gradient values at the respective target patch in the target image.

24. The non-transitory computer-readable storage medium as recited in claim 19, wherein the color gradient domain blending techniques comprise a voting technique that averages color and gradient values from the identified transformed source patches, and wherein the program instructions are further computer-executable to implement applying a screened Poisson technique to the averaged color and gradient values to integrate the color and gradient values into the target image.

25. The non-transitory computer-readable storage medium as recited in claim 19, wherein there are two or more source images, wherein the plurality of candidate source patches includes patches in each of the two or more source images, and wherein at least one transformed source patch is identified in each of at least two of the two or more source images.

* * * * *